Aug. 9, 1927.
C. E. COX
1,638,657
TESTING AND RECORDING DEVICE
Filed Aug. 22, 1921 28 Sheets-Sheet 1
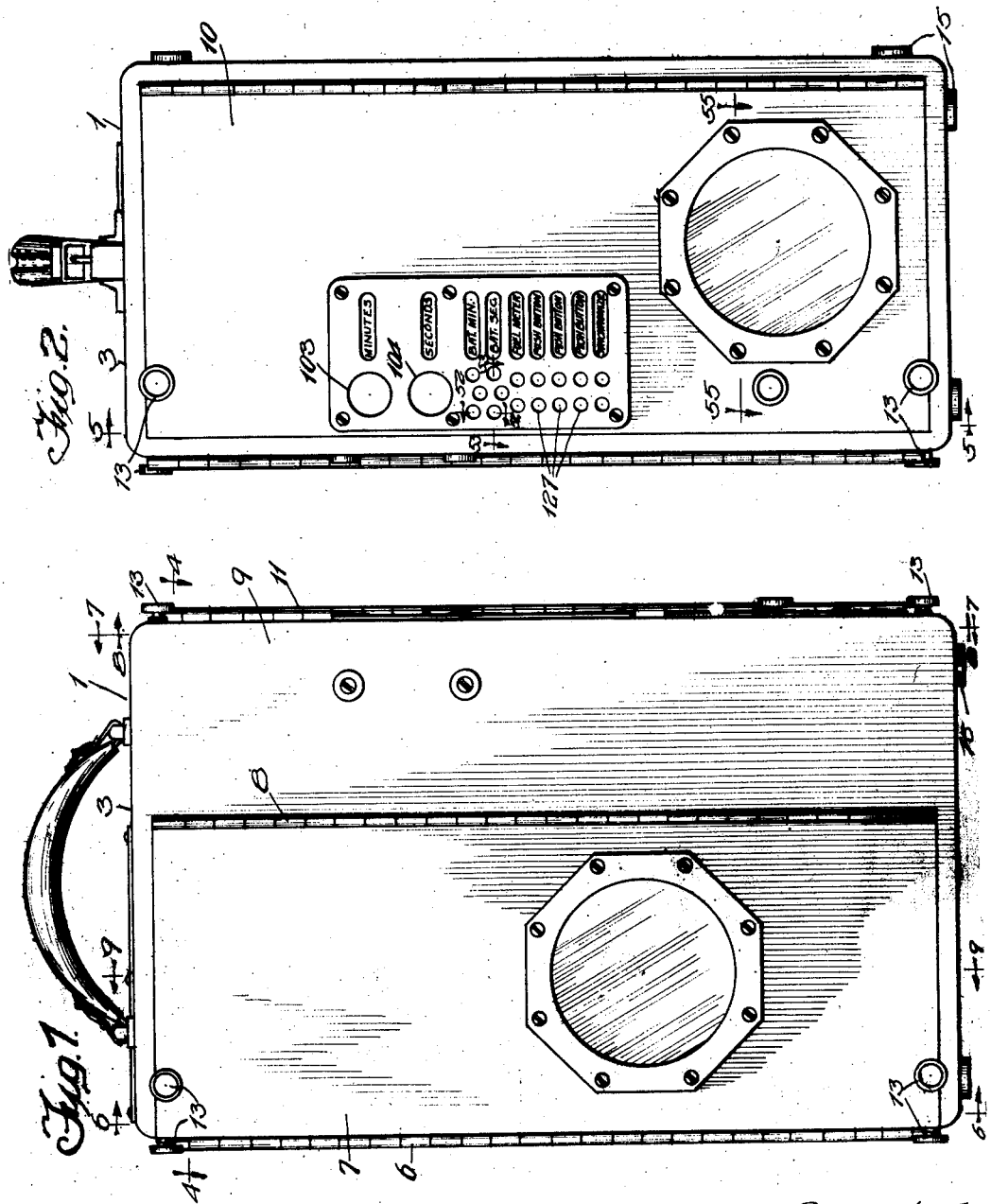

Aug. 9, 1927.

C. E. COX 1,638,657

TESTING AND RECORDING DEVICE

Filed Aug. 22, 1921     28 Sheets-Sheet 2

Witnesses:
W. F. Kilroy
Harry R. L. White

Inventor:
Claude E. Cox
By Hill & Hill Attys.

Aug. 9, 1927.

C. E. COX 1,638,657

TESTING AND RECORDING DEVICE

Filed Aug. 22, 1921 28 Sheets-Sheet 3

Aug. 9, 1927.

C. E. COX 1,638,657

TESTING AND RECORDING DEVICE

Filed Aug. 22, 1921     28 Sheets-Sheet 6

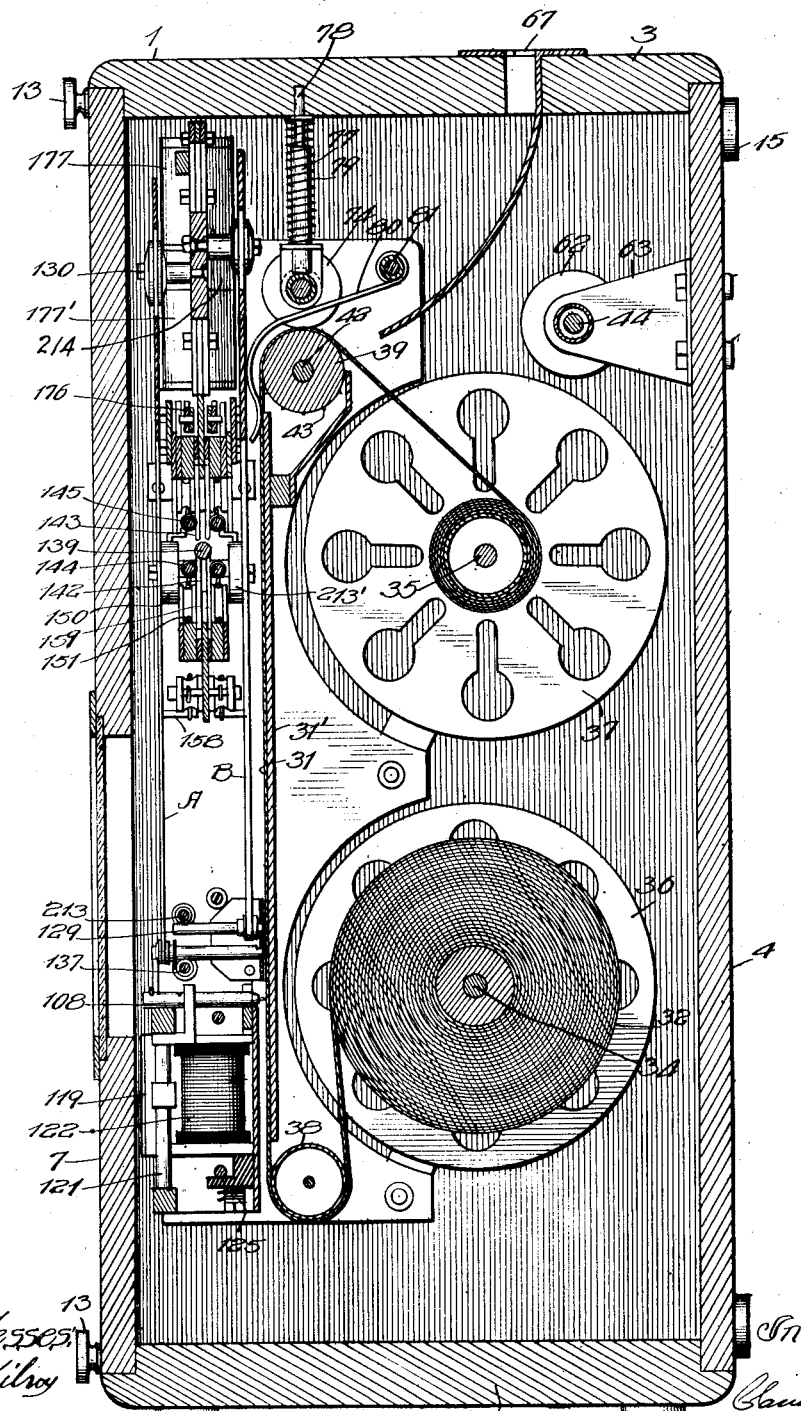

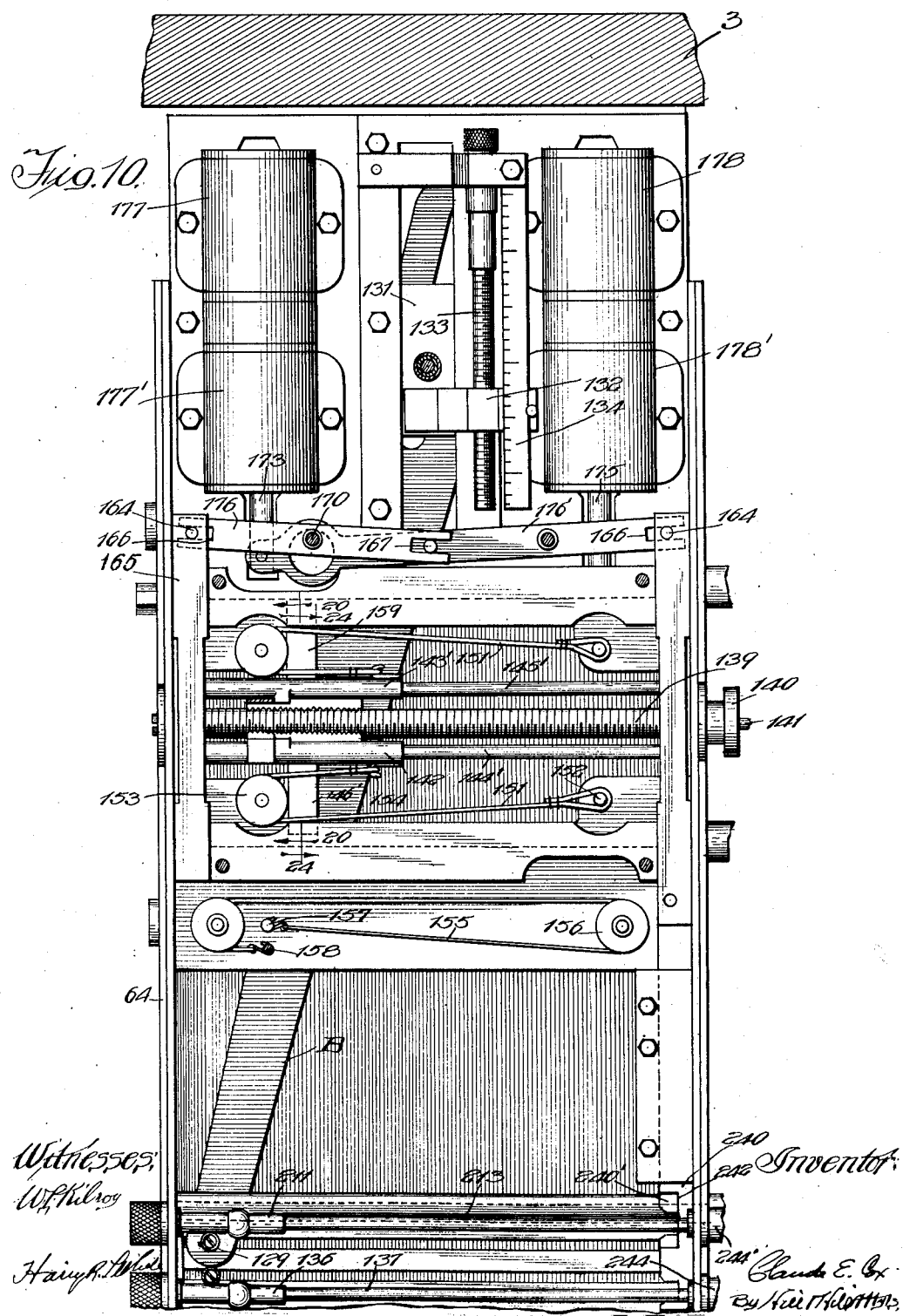

Aug. 9, 1927. 1,638,657
C. E. COX
TESTING AND RECORDING DEVICE
Filed Aug. 22, 1921 28 Sheets-Sheet 9
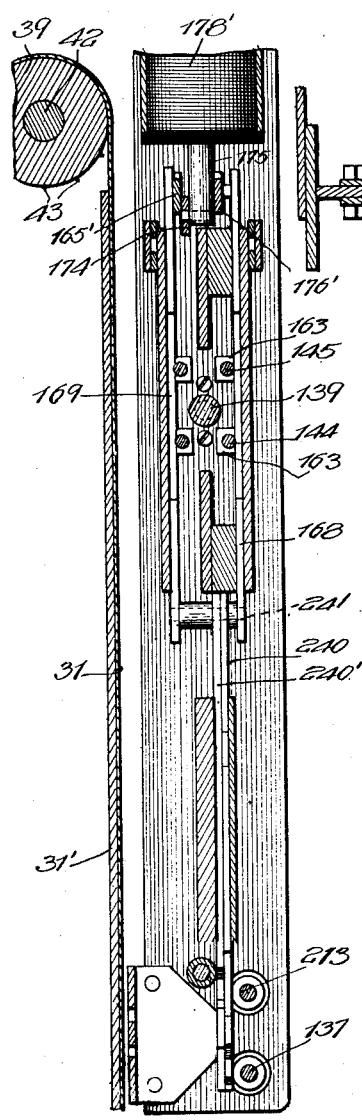
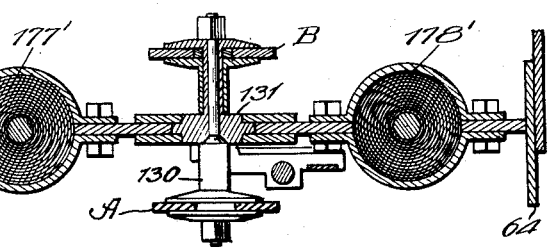
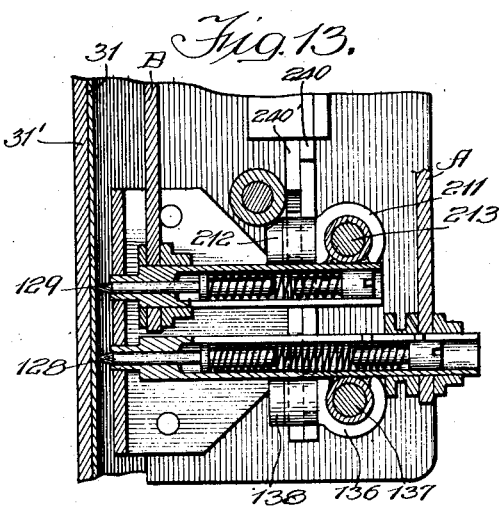
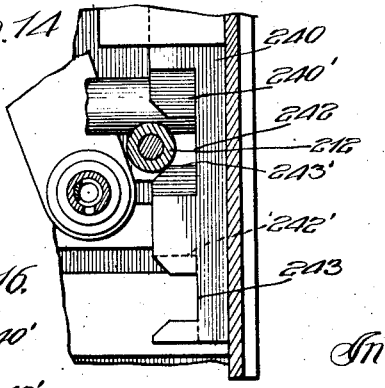
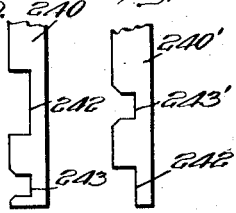
Witnesses:
W. F. Kilroy
Harry R. White
Inventor:
Claude E. Cox
By Neil & Neil Attys.

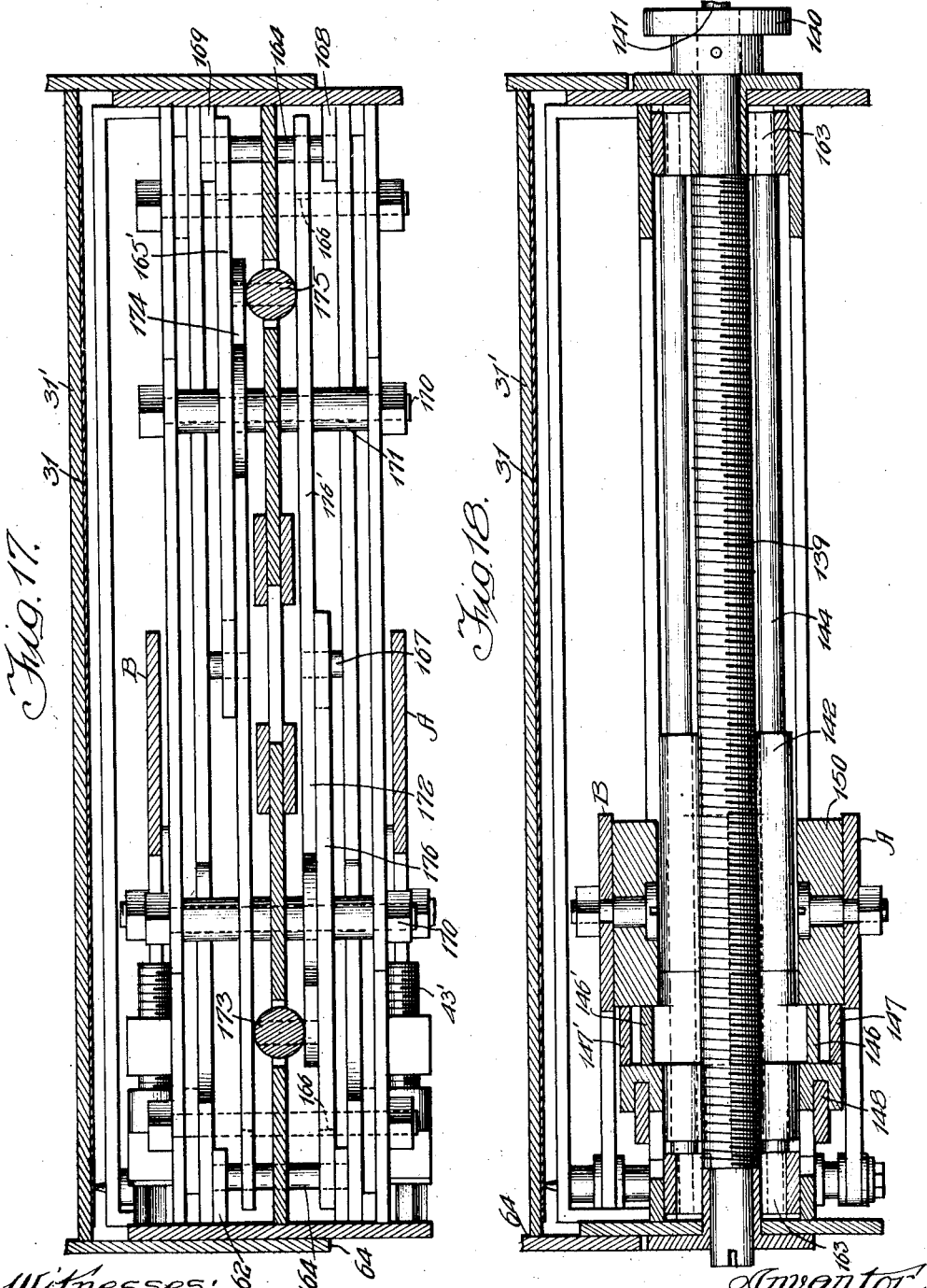

Aug. 9, 1927. 1,638,657
C. E. COX
TESTING AND RECORDING DEVICE
Filed Aug. 22, 1921   28 Sheets-Sheet 11
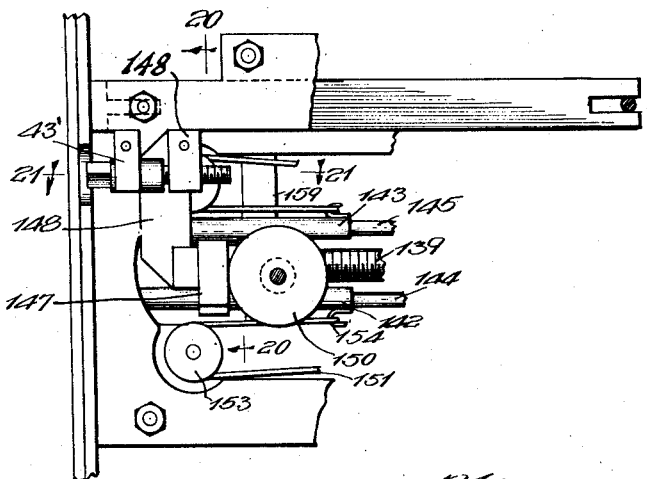
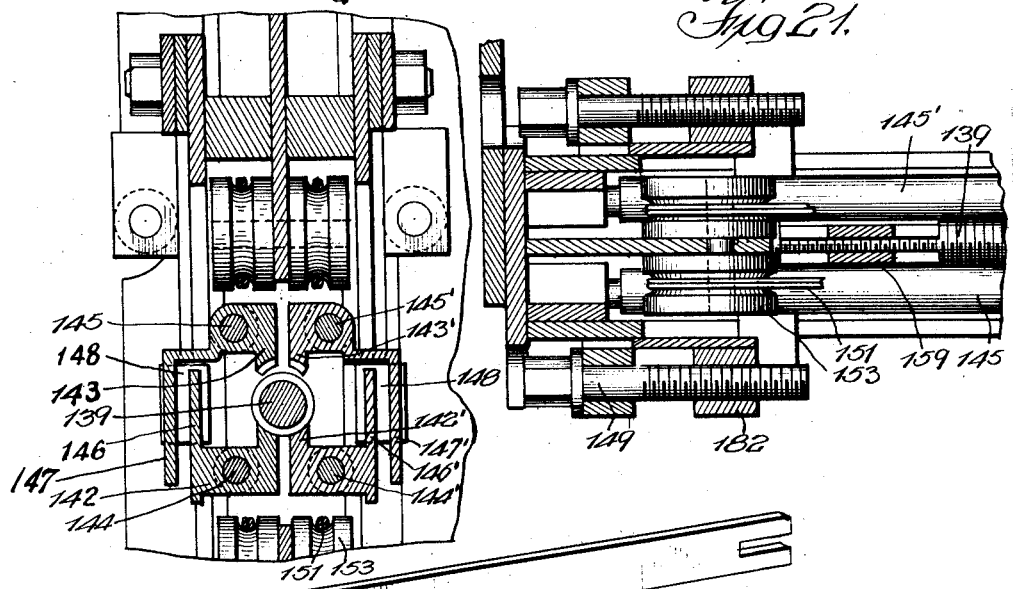
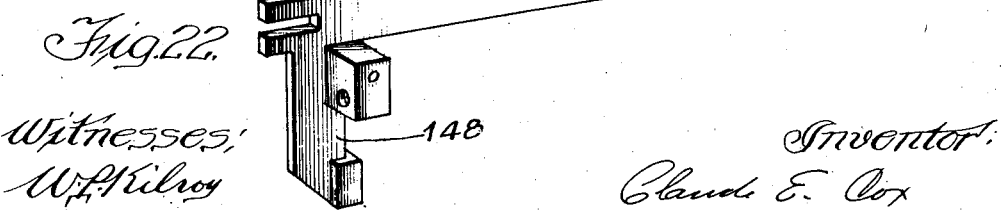
Witnesses:
W. F. Kilroy
Harry R. White
Inventor:
Claude E. Cox
By Reid & Reid Attys.

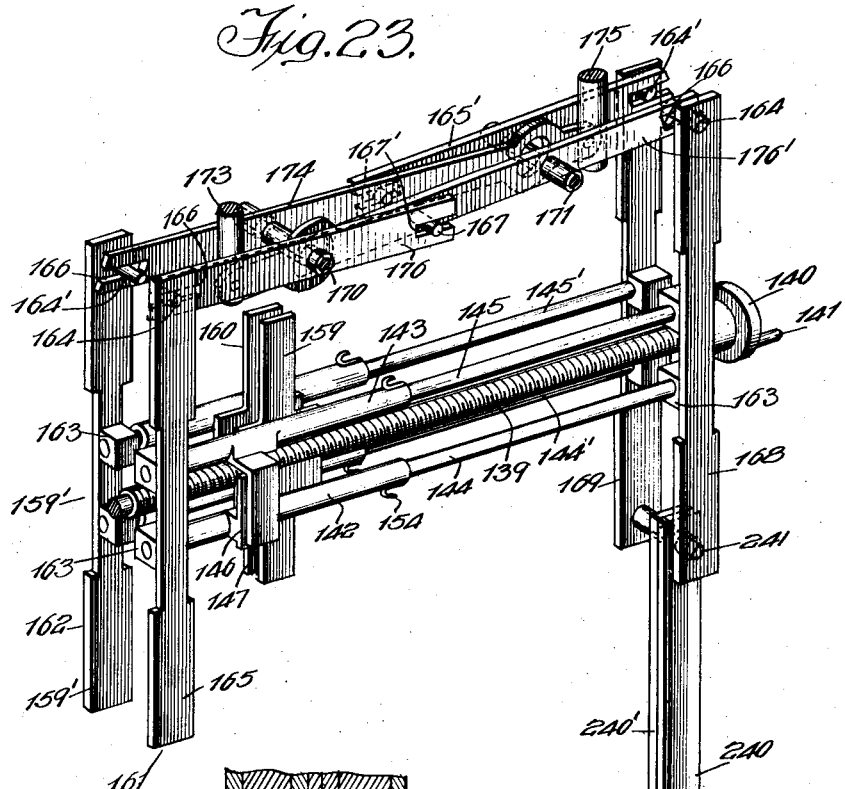

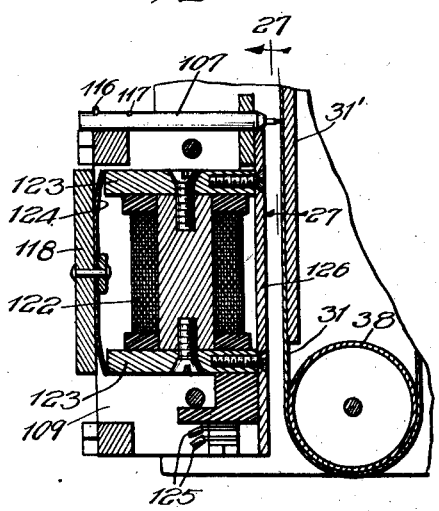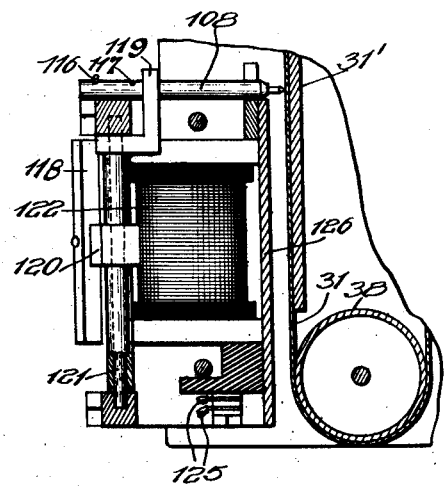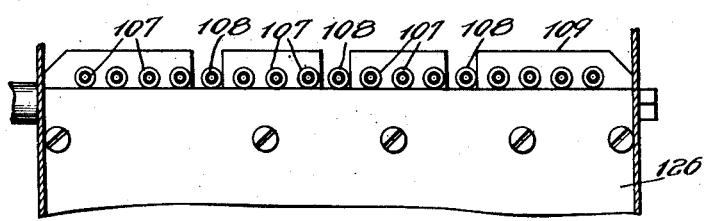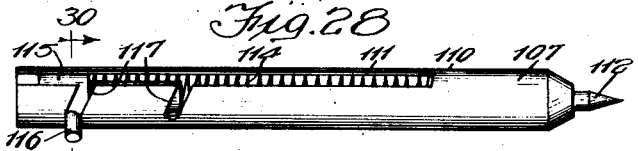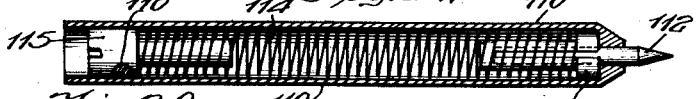

Aug. 9, 1927.

C. E. COX 1,638,657

TESTING AND RECORDING DEVICE

Filed Aug. 22, 1921        28 Sheets-Sheet 15

Aug. 9, 1927.
C. E. COX
1,638,657
TESTING AND RECORDING DEVICE
Filed Aug. 22, 1921  28 Sheets-Sheet 16
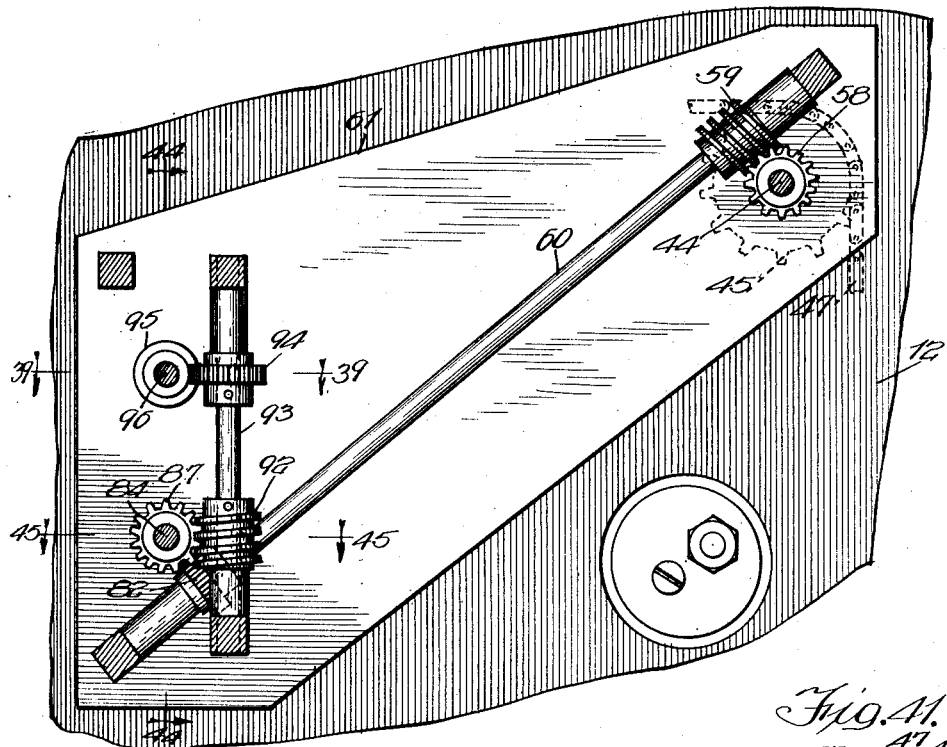
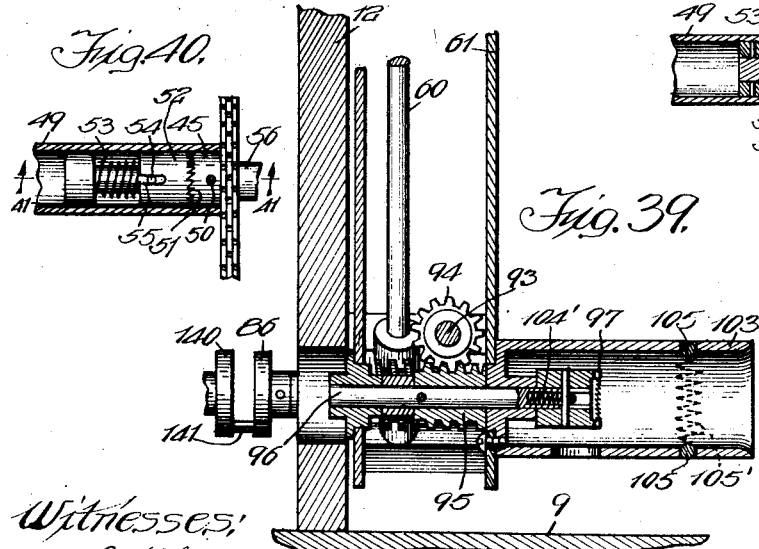
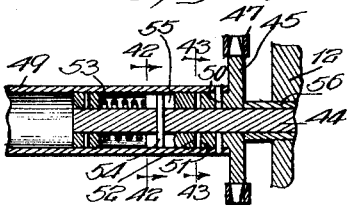

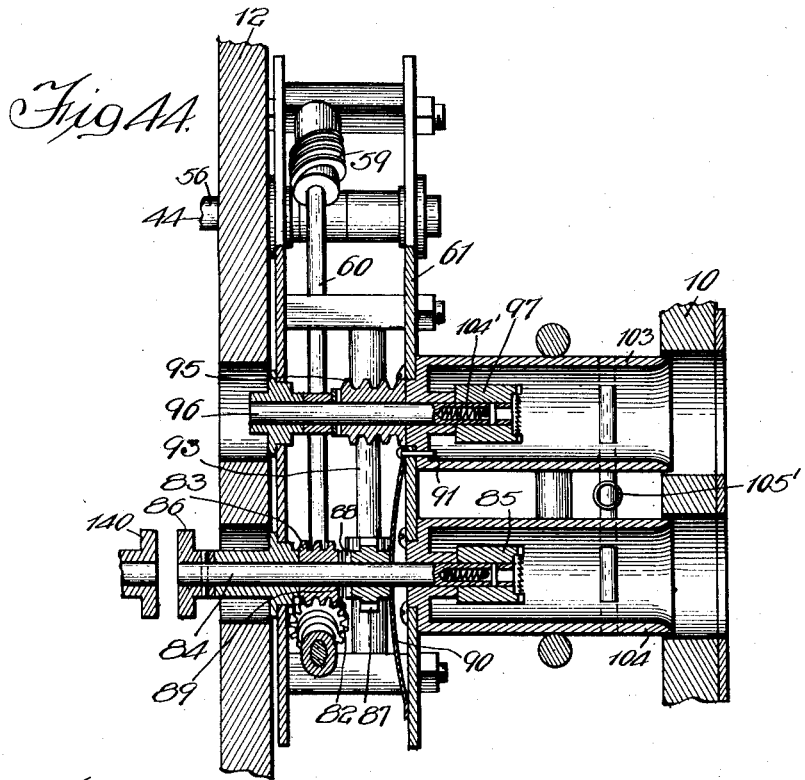

Aug. 9, 1927.

C. E. COX 1,638,657

TESTING AND RECORDING DEVICE

Filed Aug. 22, 1921   28 Sheets-Sheet 18

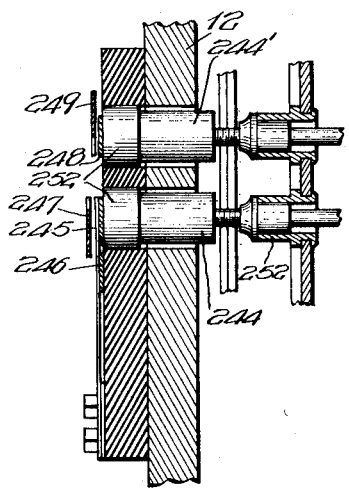
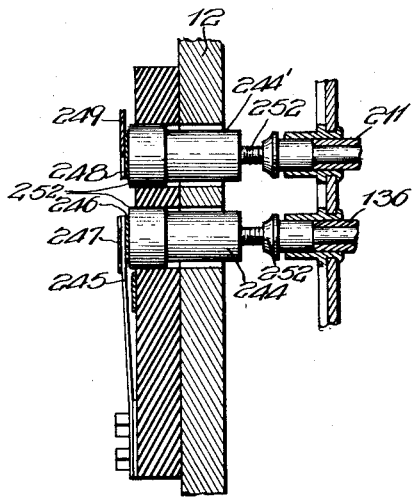
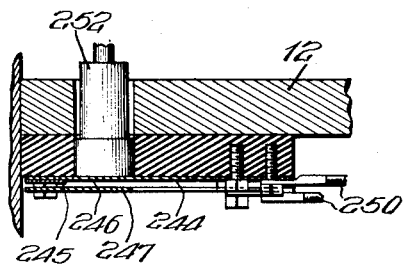
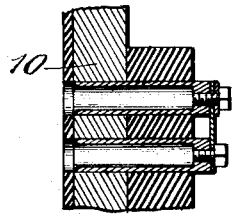
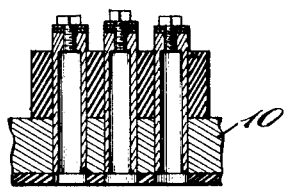

Aug. 9, 1927.  
C. E. COX  
1,638,657

TESTING AND RECORDING DEVICE

Filed Aug. 22, 1921   28 Sheets-Sheet 20

Witnesses:  
W. F. Kilroy  
Harry R. White

Inventor:  
Claude E. Cox  
By Hiett Hill Attys.

Aug. 9, 1927.

C. E. COX 1,638,657

TESTING AND RECORDING DEVICE

Filed Aug. 22, 1921  28 Sheets-Sheet 21

Aug. 9, 1927.

C. E. COX 1,638,657

TESTING AND RECORDING DEVICE

Filed Aug. 22, 1921  28 Sheets-Sheet 22

Witnesses:
W. P. Kilroy
Harry R. L. White

Inventor:
Claude E. Cox
By Nail & Nail Attys

Aug. 9, 1927. 1,638,657
C. E. COX
TESTING AND RECORDING DEVICE
Filed Aug. 22, 1921 28 Sheets-Sheet 23

Witnesses:
W. F. Kilroy
Harry R. L. White

Inventor:
Claude E. Cox
By ............ Attys.

Aug. 9, 1927.
C. E. COX
1,638,657
TESTING AND RECORDING DEVICE
Filed Aug. 22, 1921    28 Sheets-Sheet 24
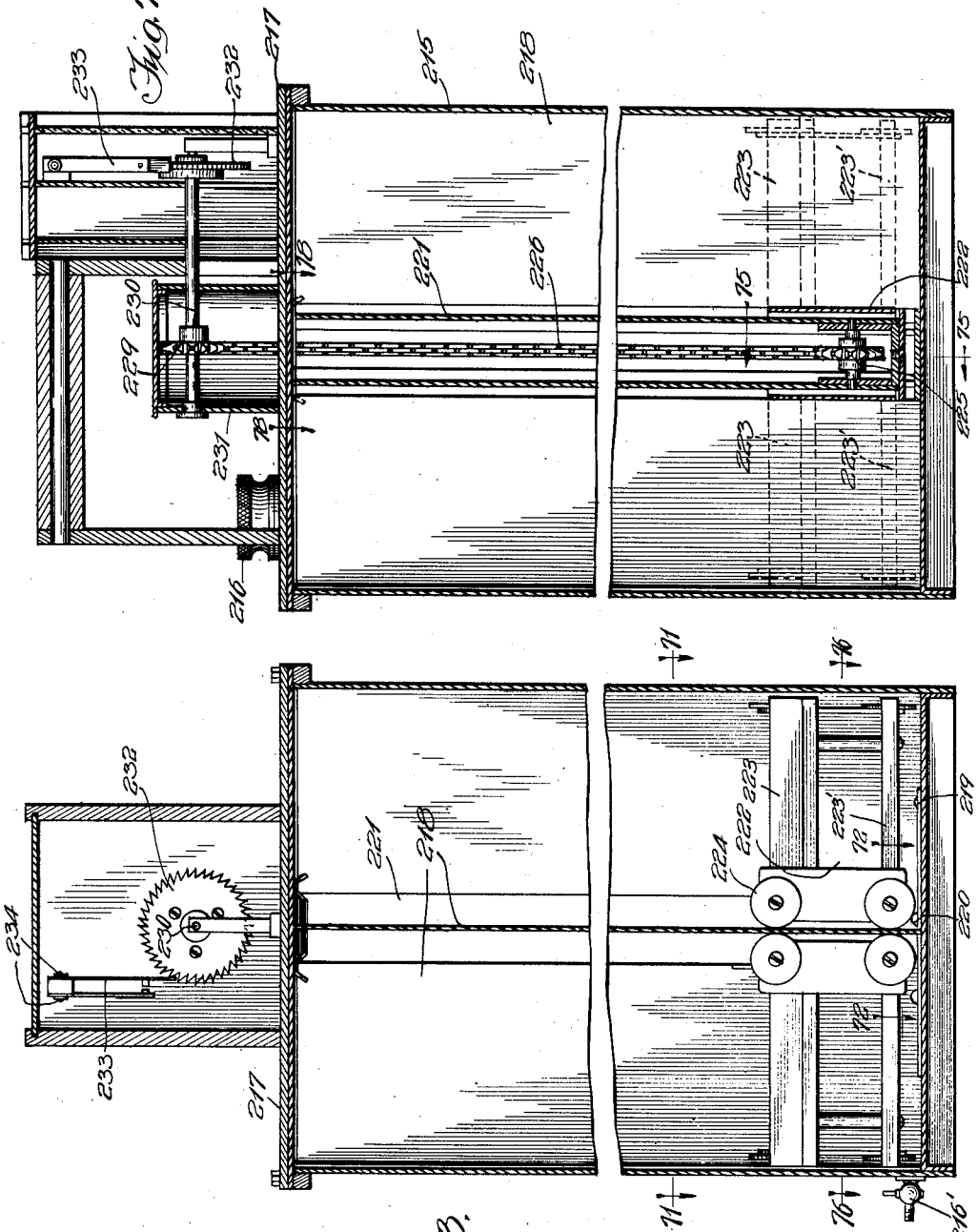

Aug. 9, 1927.
C. E. COX
1,638,657
TESTING AND RECORDING DEVICE
Filed Aug. 22, 1921    28 Sheets-Sheet 25
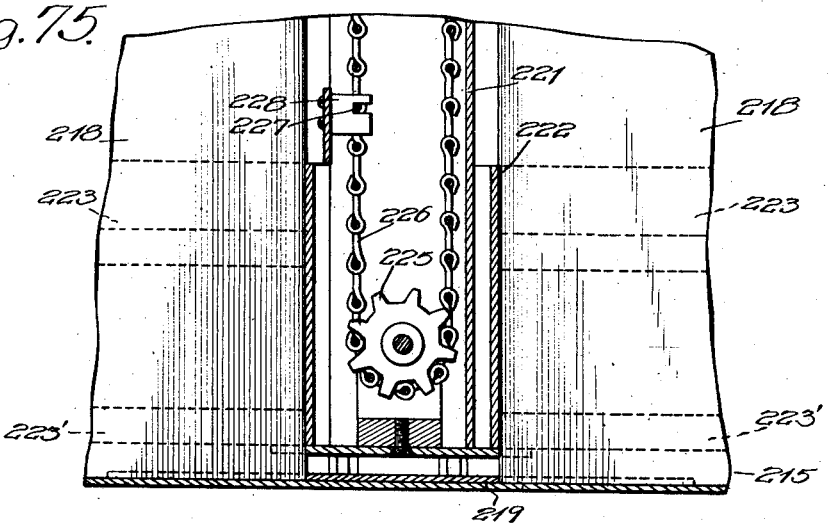
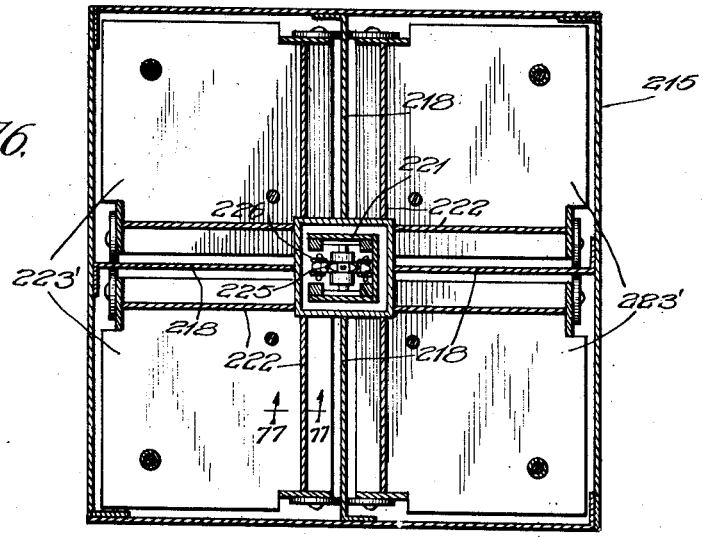
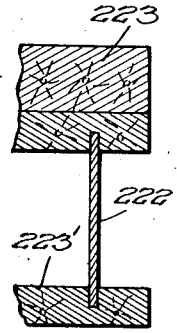
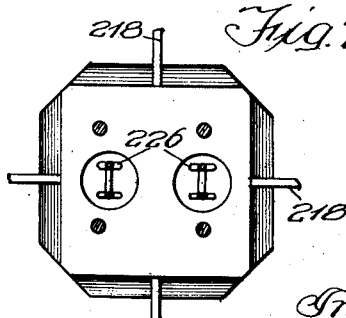

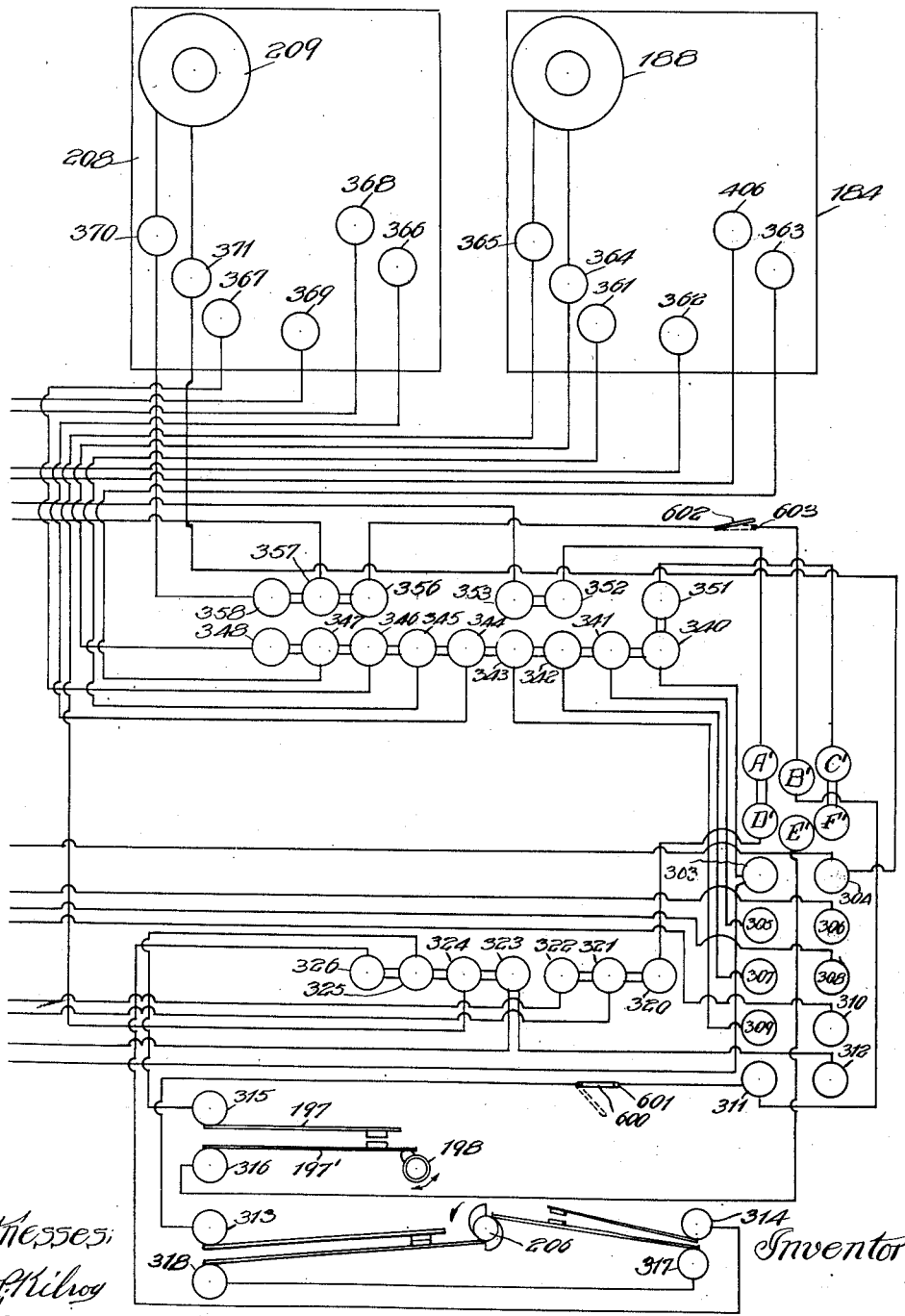

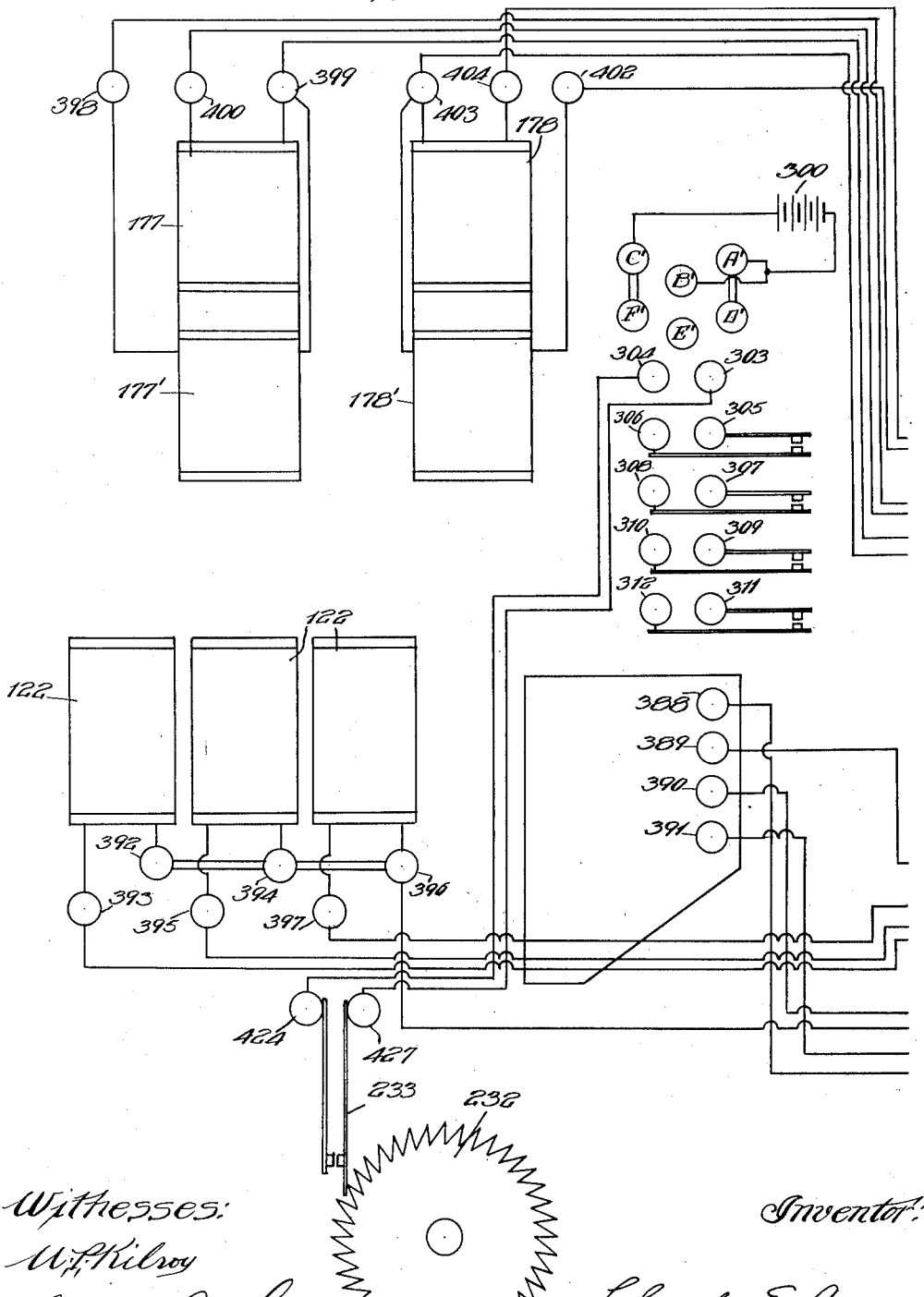

Aug. 9, 1927.
C. E. COX
1,638,657
TESTING AND RECORDING DEVICE
Filed Aug. 22, 1921
28 Sheets-Sheet 28
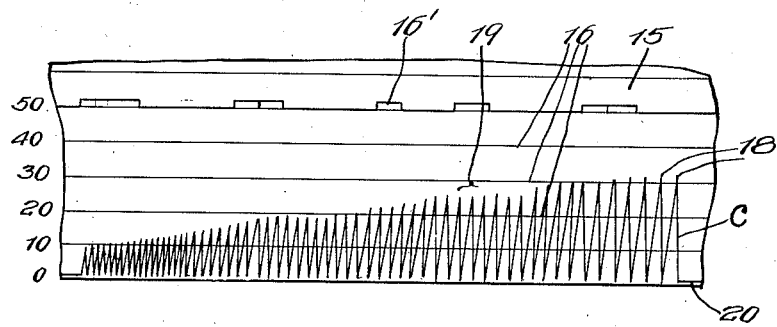
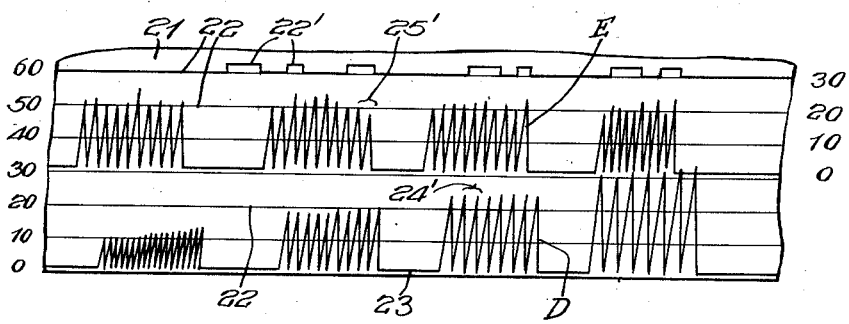
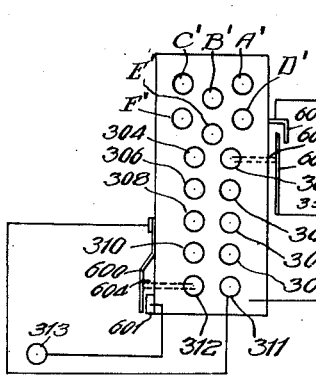
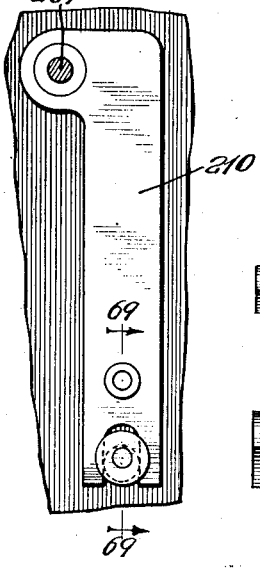
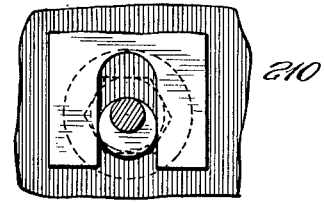
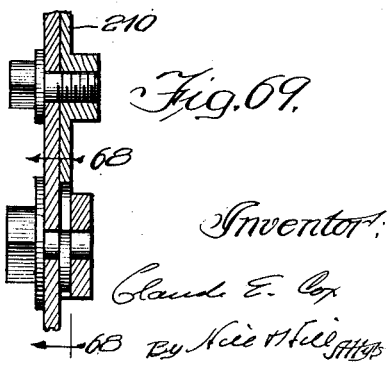

Patented Aug. 9, 1927.

1,638,657

UNITED STATES PATENT OFFICE.

CLAUDE E. COX, OF DETROIT, MICHIGAN.

TESTING AND RECORDING DEVICE.

Application filed August 22, 1921. Serial No. 494,205.

My invention belongs to that general class of devices known as testing and recording devices, and particularly relates to a mechanism particularly suited for accurately testing, measuring and recording the performance of motor vehicles of various kinds on the road, so that the performance can be accurately checked up with the calculations of the engineering department and laboratory test of various units, such as axles, transmissions, motors and carburetors, whereby improvements can be made from tests under actual operating conditions by comparing accurate records of the performance of different accessories or attachments. The invention has among its objects the production of an apparatus of the kind described that is simple, compact, convenient, durable, reliable, efficient and satisfactory for use wherever found applicable. It has among its further objects the production of a device which is accurate, and the record of which may be conveniently interpreted without requiring extensive calculations and transferring to plotting paper or other additional labor. The apparatus herein set forth, as well as the method employed, permits recording all the factors involved in the performance of the vehicle or device tested in producing a record so that the same can be easily interpreted and compared directly with any record made at any other time on the same car or vehicle, or any other vehicles on which similar tests were made. The device is adapted to produce records to be used in determining acceleration, hill climbing ability, coasting resistance, friction loss of the chassis or friction loss in the motor, and as herein illustrated, it may also be employed to record fuel consumption, whereby the efficiency of the vehicle may be determined while operating under all conditions, so far as fuel consumption is concerned. In addition to the preceding, the device is constructed to substantially make its own charts, and the device may be controlled to record certain incidents, such as the beginning of a test, end of a test, passing a given point during a test, recording distance marks on the road or on hills, or a variety of incidents which the driver might desire to record on the chart to be considered later in connection with the record, all of which incidents or features can be recorded and perfectly identified at any time directly from the chart without additional notes. It is also possible with the instrument to record engine revolutions simultaneously with the car speed, and to check slippage between the front and rear wheels, or any such arrangement as desired, and where desired, wind velocities and their effect on car performance may be determined. In fact many uses for the particular device other than those enumerated may be found. My device may be used for recording various performances of other mechanisms than motor vehicles, as for instance, stationary engines, aeroplanes, ships, etc. The invention has broadly among its objects the production of a device of the kind described that is exceedingly accurate, may be easily interpreted, may be calibrated as found necessary, and which will be easy to operate and without requiring time to calculate various features shown as a result of the tests. Many other objects and advantages of the construction herein shown and described will be obvious to those skilled in the art from the disclosures herein given.

To this end my invention consists in the novel construction, arrangement and combination of parts herein shown and described, and more particularly pointed out in the claims.

In the drawings, wherein like reference characters indicate like or corresponding parts—

Fig. 1 is a front elevation;
Fig. 2 is a side elevation;
Fig. 3 is a top plan view;
Fig. 4 is a plan section on line 4—4 of Fig. 1;
Fig. 5 is a section on line 5—5 of Fig. 2;
Fig. 6 is a section on line 6—6 of Fig. 1;
Fig. 7 is a section on line 7—7 of Fig. 1;
Fig. 8 is a section on line 8—8 of Fig. 1;
Fig. 9 is a section on line 9—9 of Fig. 1;
Fig. 10 is an enlarged section on line 10—10 of Fig. 6;
Fig. 11 is a cross section on line 11—11 of Fig. 5;
Fig. 12 is a plan section on line 12—12 of Fig. 5;
Fig. 13 is a detail section on line 13—13 of Fig. 5;
Fig. 14 is a detail section showing how the safety arm is tripped to release the nut;
Fig. 15 is a detail of one of the safety arms;
Fig. 16 is a detail of the safety arm;
Fig. 17 is a section on line 17—17 of Fig. 5;

Fig. 18 is a section on line 18—18 of Fig. 5;

Fig. 19 is a partial elevation of the adjustment stop;

Fig. 20 is a section on line 20—20 of Fig. 10;

Fig. 21 is a section on line 21—21 of Fig. 19;

Fig. 22 is a perspective of the stop arm;

Fig. 23 is a perspective view of the clutch nut for operating the pencil arm;

Fig. 24 is a section on line 24—24 of Fig. 10;

Fig. 25 is a section on line 25—25 of Fig. 5;

Fig. 26 is a section on line 26—26 of Fig. 5;

Fig. 27 is an elevation of the pencil holders;

Fig. 28 is a side elevation of the pencil;

Fig. 29 is a section of the pencil shown on line 29—29 of Fig. 30;

Fig. 30 is a section on line 30—30 of Fig. 28;

Fig. 31 is a detail section of the lead holder;

Fig. 38 is a section of the gear box on line 38—38 of Fig. 4;

Fig. 39 is a section on line 39—39 of Fig. 38;

Fig. 40 is a plan section of the paper feed clutch section on line 40—40 of Fig. 38;

Fig. 41 is a cross section on line 41—41 of Fig. 40;

Fig. 42 is a section on line 42—42 of Fig. 41;

Fig. 43 is a cross section on line 43—43 of Fig. 41;

Fig. 44 is a cross section of the gear box on line 44—44 of Fig. 38;

Fig. 45 is a section on line 45—45 of Fig. 38;

Fig. 46 is a section on line 46—46 of Fig. 45.

Fig. 49 is a section on line 49—49 of Fig. 7;

Fig. 50 is similar to Fig. 49 in changed position;

Fig. 51 is a section on line 51—51 of Fig. 7;

Fig. 52 is a section on line 52—52 of Fig. 2;

Fig. 53 is a section on line 53—53 of Fig. 2;

Fig. 67 is a detail section of the adjusting arm, taken on line 67—67 of Fig. 65;

Fig. 68 is an enlarged section of the adjusting cams, taken on line 68—68 of Fig. 69;

Fig. 69 is a section taken on line 69—69 of Fig. 67;

Fig. 73 is a cross section on line 73—73 of Fig. 70;

Fig. 74 is a section on line 74—74 of Fig. 70;

Fig. 75 is a section on line 75—75 of Fig. 74;

Fig. 76 is a plan section on line 76—76 of Fig. 73;

Fig. 77 is a section on line 77—77 of Fig. 76;

Fig. 78 is a section on line 78—78 of Fig. 74;

Figs. 79 and 80 are electrical circuit diagrams of the machine;

Figs. 81 and 82 illustrate specimen charts or records; and

Fig. 83 represents diagrammatically the automatic control of certain circuits under certain conditions.

Figure 3:
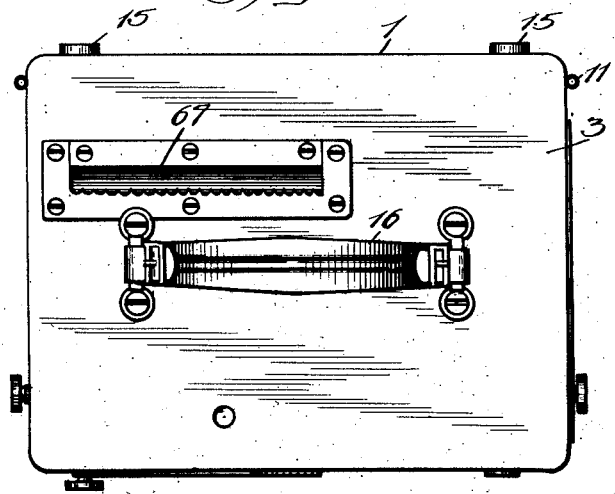
Figure 4:
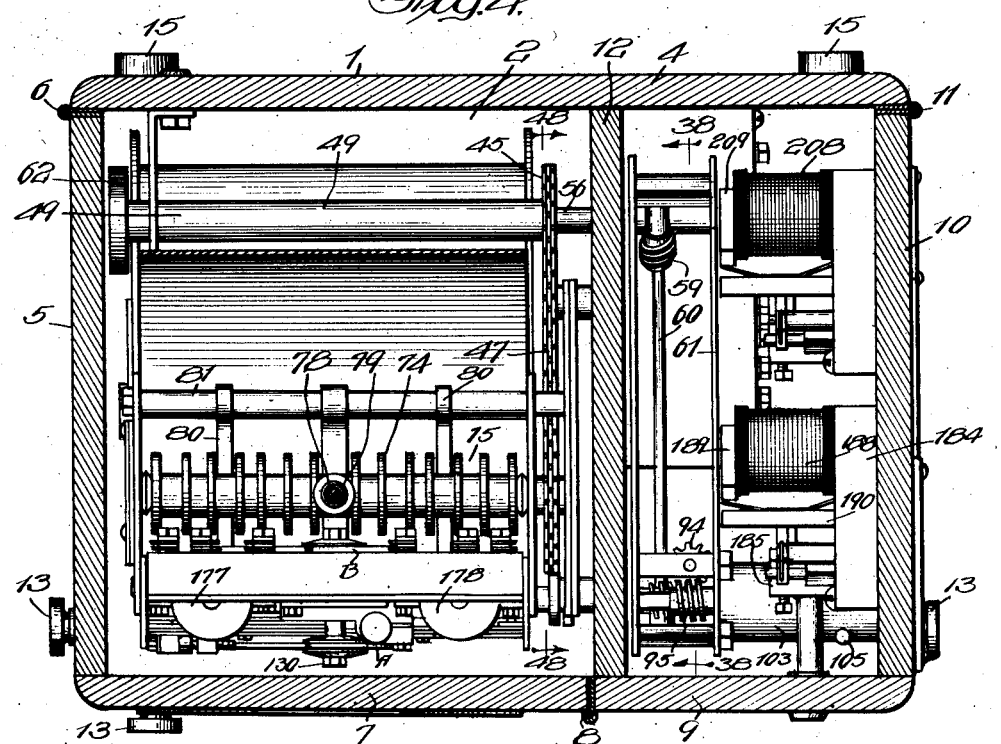

Referring to the drawings, it may be mentioned that I preferably provide a suitable case or container for my device which may be constructed of any suitable material and of the desired design. The type of case shown, however, is particularly convenient, inasmuch as it is conveniently arranged for carrying the mechanism and permitting inspection thereof and adjustment, as well as operation, of the device. As shown, the preferred container consists of a casing 1 made up of a bottom 2 and top 3. As shown, sides 4 and 9 are substantially stationary and connect the top and bottom, while sides 5 and 10 and side portion 7 are preferably hinged as indicated at 6, 7 and 11, so that the side portions 5, 7 and 10 may be opened to permit inspection and access to the mechanism. The several sides that open are normally secured closed by the fastening members 13 or equivalent means for the purpose. I also prefer to provide a partition 12 dividing the case into two compartments, and also reinforcing and stiffening the same. Into the two compartments I arrange the several mechanisms and their controlling and driving mechanisms.

In Figs. 81 and 82 I have illustrated specimen charts or records, it being understood that these are merely illustrative. In Fig. 81, 15 represents the chart or paper sheet, and 16 the scale lines, 20 being the base scale line, and 16' a scale line indicating certain facts in code. C is the curve which is in a series of peaks, 18—18 representing the speeds or velocities, in this particular case, velocity per second, the distance 19 representing an interval of one second. The height or distance of the peak 18 from the base line indicates the speed or velocity. By means of the code scale line 16', certain facts may be recorded, as previously mentioned. One or more of the scale lines may be in code, as indicated at 16', as will be hereinafter referred to.

In Fig. 82, 21 represents the chart and 22 the scale lines, 23 being the base line. In this case the velocity curve D is substantially similar in shape to the other curve, except that the distances between the peaks in this particular instance represents minute intervals. The curve E represents fuel consumption in increments but with a different number of peaks than in the velocity curves, each peak representing the use of a given increment of fuel and the height of the peak representing miles per gallon, the same being exactly to the same scale as is used with the velocity curve. The range required is not nearly so great, so that only a small part is covered by the full curve, the average range being from five to twenty-five miles per gallon. In this particular instance the rate of paper feed or travel of the chart is preferably one-sixtieth of that used in making the velocity curve shown in Fig. 81. I have also shown a code line 22', which represents one of the scale lines, it being understood that one or more of the scale lines may be made in this fashion.

The offsetting of one or more chart lines or scale lines may be utilized in recording incidents, such as the beginning of a test, end of a test, passing a given point during a test, recording distance marks on a road or on hills, or a variety of incidents which the operator may wish to record on a chart to be considered later in connection with the record. By using a code of long and short offsets, a variety of incidents may be recorded and can be perfectly identified at any time directly from the chart, without additional notes. By employing a circuit breaker, as will be hereinafter set forth, the engine revolutions can be simultaneously recorded, with the correct speed, by varying one of the chart or scale lines. Likewise slippage between the front and rear wheels or the two rear wheels can be recorded by attaching a circuit breaker to each wheel and indicating the revolutions by the scale lines as set forth. This is also true as to air velocities, in which a circuit breaker may be attached to an anemometer, and various other points found desirable may be likewise recorded.

When my device is used on a ship, a variety of other incidents may be recorded, as found desirable by the operator.

The chart paper 31 is carried on the supply roll 32 (see Figs. 6, 9, 35 and 48) and feeds over a chart table or track 31' through feed rolls 38 and 39, roll 39 being positively driven by a driving gear assembly 61. The supply roll is carried on an axle or shaft 34, said shaft being carried by side arms 57 positioned at the side frame 64 of the device. At the ends of the roll 32 are removable flanges 36, the side arms 57 being adapted to be moved out of engagement with the axle, whereby the rolls may be removed or renewed.

The receiving roll 33 is mounted on an axle 35 carried by similar side arms 57 mounted between the side walls 64 of the frame. The upper feed roll 39, which is positively driven, is mounted upon a shaft 42, the roll 39 having laterally projecting lugs or pins 43 for a more positive driving engagement with the chart, as shown in Figs. 9, 35, 36 and 37. Carried by a supporting hub 56 attached to gear box 61 mounted in a side wall of the casing is a sprocket wheel 45, said sprocket being loosely mounted and adapted to be engaged by a sprocket chain, belt or other equivalent device 47, said sprocket chain engaging the sprocket wheels 65 and 66 mounted on the shaft 35 and 42 respectively, whereby the rotation of the shaft 44 with its sprocket 45 will cause the feed roll and receiving roll to be driven in unison. A bracket 63 is secured to the wall 4 and carries a sleeve 49 having an open end to one side of the sprocket, there being a locking pin 50 between said sleeve and sprocket 45, as shown in Figs. 40, 41, 42 and 48. The inner edges of the sprocket 45 have ratchet or clutch teeth 51 thereon adapted to engage with the clutch member 52 slidably carried on the shaft 44, said clutch part 52 having a slot 55 therein adapted to receive a transverse pin 54 carried by the shaft 44. A resilient spring 53 is arranged between the clutch part 52 and a shoulder suitably formed on the shaft 44 to resiliently maintain the opposed clutch teeth in engagement with one another. At the outer end of the sleeve 49 is an annular enlarged and preferably knurled knob or gripping portion 62, whereby the gear sprocket 45 may be manually turned. A manual rotation of the knob and sprocket 45 will drive the feed roll 42 and the receiving roll 33. This manual drive of the feed roll is done only when it is desired to inspect the chart after a short test, the chart in this case being cut from the receiving roll 33 and directed through the outside paper guide 67, as shown in Figs. 3 and 9. Each test chart can be torn off as made and compared with other tests, the length of the chart fed through being exactly proportionate to the number of revolutions of the front wheel of the cars or track, as will be hereinafter more fully explained, and from the length of the chart the number of revolutions of the wheels can be determined if so desired. The chart may be driven independently of the apparatus being tested, by any suitable means such as electrically, or by a spring motor or other mechanical device. The shaft 44 is driven by a gear wheel 58, said gear wheel being in turn driven by a worm wheel 59 secured to a drive shaft 60 carried by the gear assembly.

Figure 35:
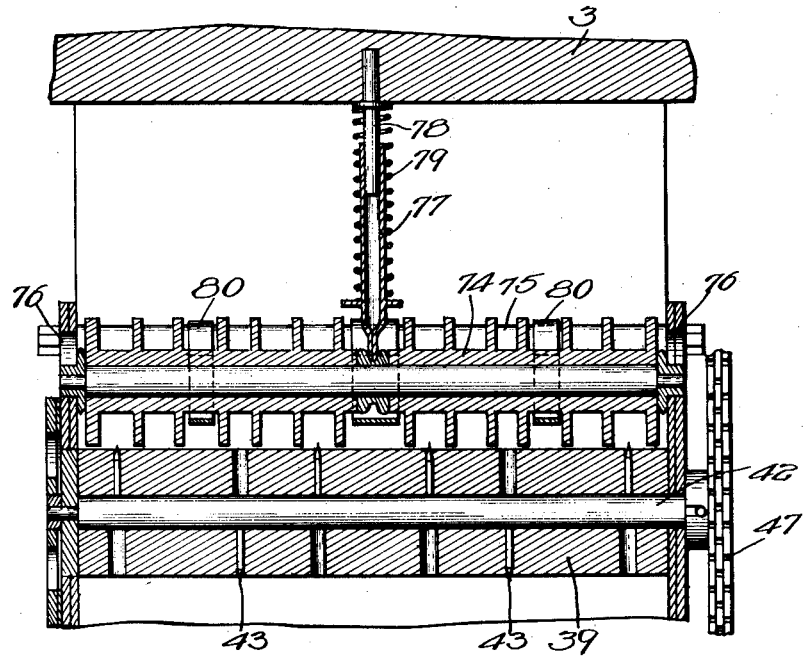
Fig. 35 is a cross section of the paper feed on line 35—35 of Fig. 6.
Figure 36:
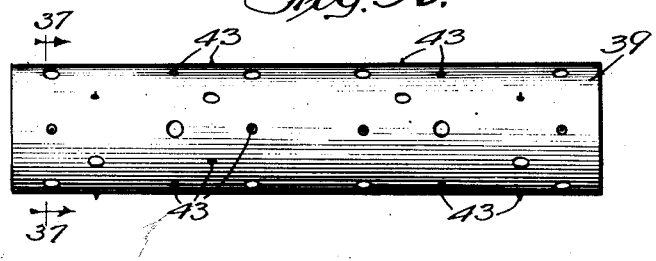
Fig. 36 is an elevation of the paper roll feed.
Figure 37:
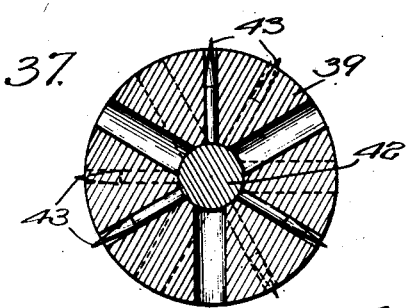
Fig. 37 is a section on line 37—37 of Fig. 36.

In order to maintain a constant and uniform pressure on the feed roll 39 and maintain paper in close contact, I have provided a pressure or idler roll 74 having a series of longitudinally spaced annular flanges, with recesses 75 therebetween, the recesses being in alignment with the radial pins 43 of the feed roll 39, as shown in Fig. 35, there being means (not shown) whereby the receiving roll is driven at a progressively changing angular speed so as to compensate for the change in diameter of the chart roll.

The pressure or idler roll 74 is slidably mounted in slots 76 in the frame walls so as to be movable radially of the feed roll 39. An arm 77 bears on the pressure roll 74, as shown in Fig. 35, said arm being preferably hollow, as shown, and is telescopically connected to a rod 78 loosely fixed in the top wall 3 of the mechanism, there being a resilient spring 79 between the parts 78 and 77 to constantly urge the roll 74 against the roll 39.

One or more arm members 80, having their free ends in engagement with the upper portion of the chart and adapted to press it against the chart track 31, are fixed to a stationary part of the device at its opposite end as at 81, see Fig. 9, said arms 80 being preferably of flexible or resilient material so as to bear against said chart and keep it against the track, and also aiding in inserting the paper.

The drive for the worm member 59, which is transmitted through the shaft 60, consists of a gear 82 at the opposite end of the shaft 60 (Fig. 38) from the worm 59, said gear 82 being adapted to intermesh with a worm wheel 83 positioned at right angles thereto, said worm wheel 83 being fixed to a shaft 84 (Fig. 44), laterally of the wall 12 and substantially intermediate the ends of said shaft. One end of said shaft 84 has a coupling member 86 thereon for driving the plotting arms, as will be hereinafter described, while the opposite end of said shaft has a clutch member 85 thereon adapted to be detachably interengaged by suitable driving means connected through a suitable flexible shafting to any rotating part of the device to be tested, as for instance, the front wheel cap. One face of said worm 83 has a clutch surface 89 thereon adapted to be detachably interengageable with a cooperating clutch surface 88 formed on a gear 87 slidably mounted on the shaft 84.

Figure 47:
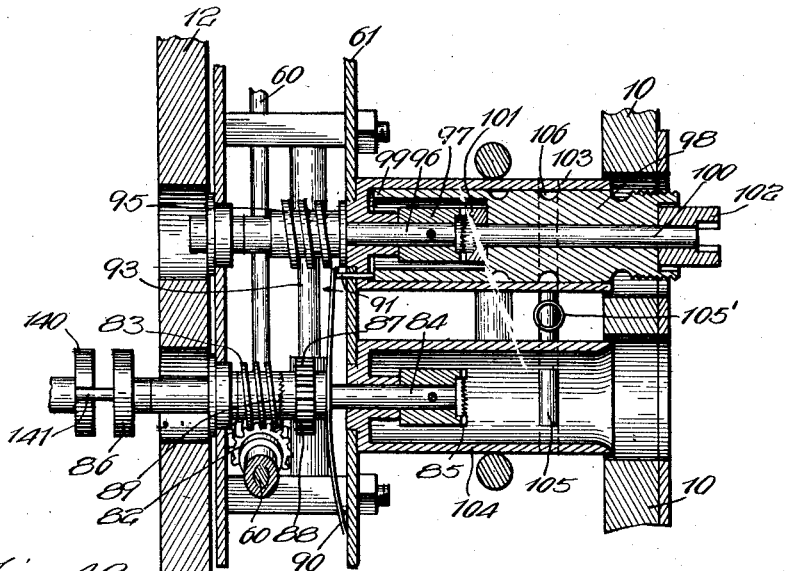
Fig. 47 is a section similar to Fig. 44 showing the drive from the flexible shaft to the gear box.
Figure 48:
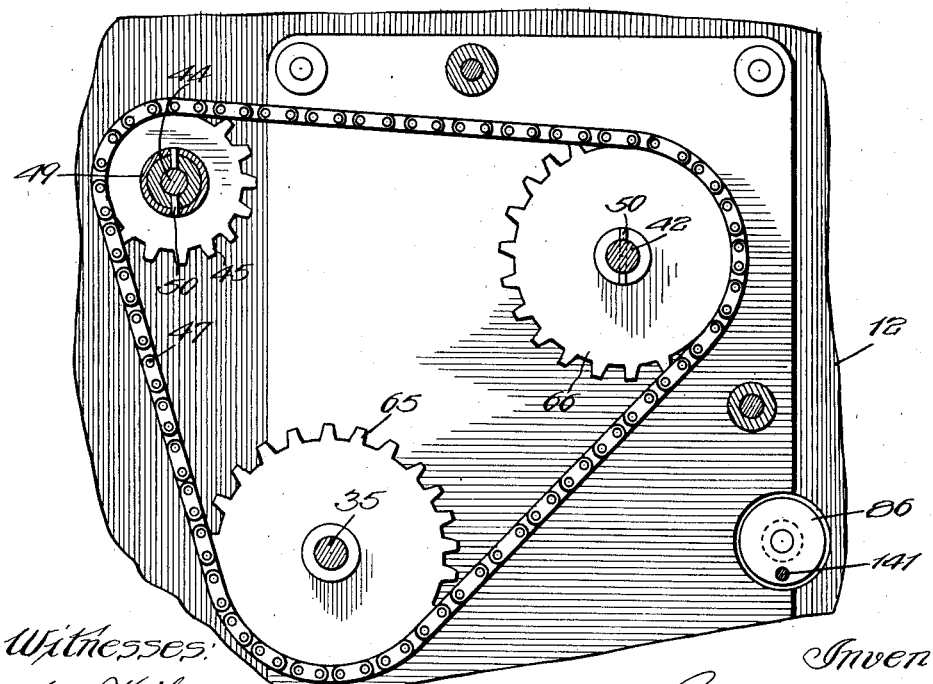
Fig. 48 is a section on line 48—48 of Fig. 4.
Figure 54:
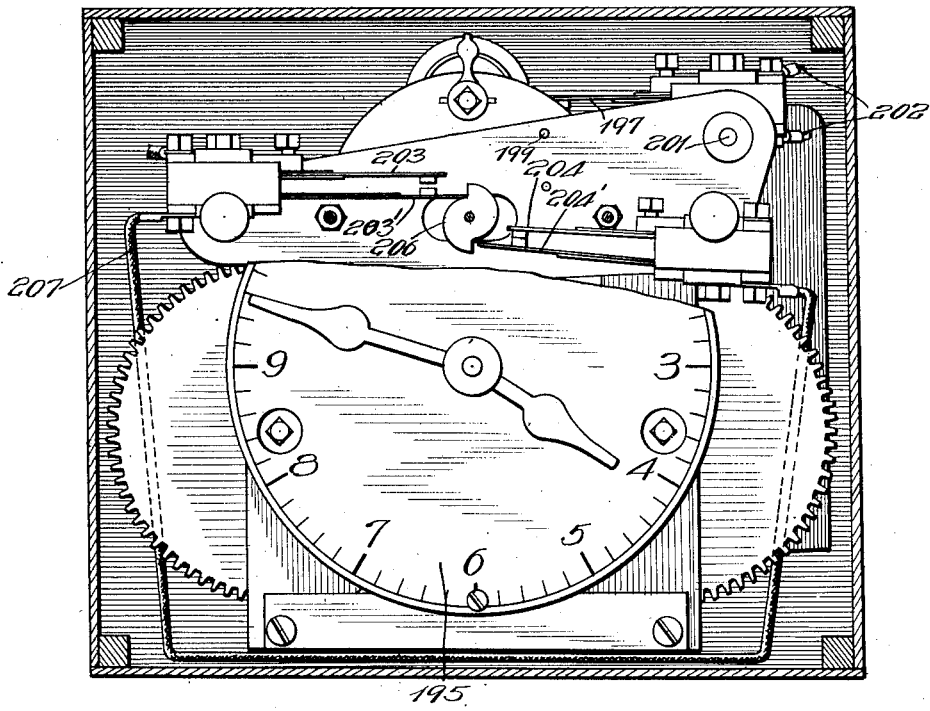
Fig. 54 is a view of the clock circuit.
Figure 55:
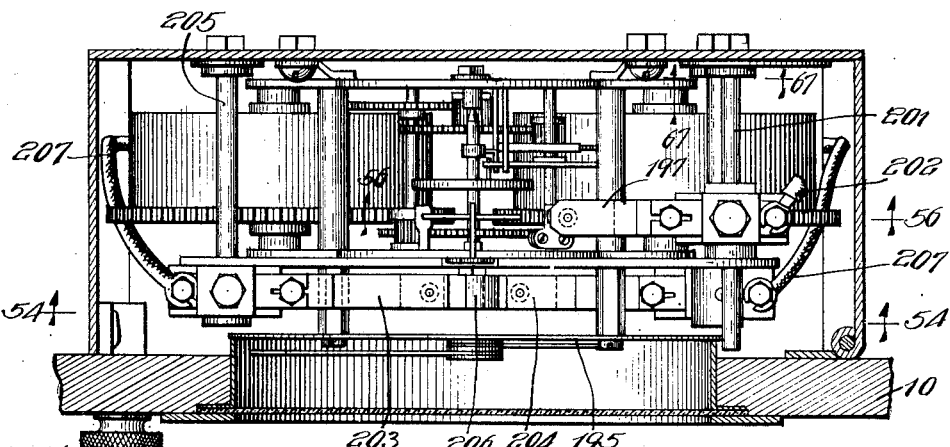
Fig. 55 is a section on line 55—55 of Fig. 2.
Figure 56:
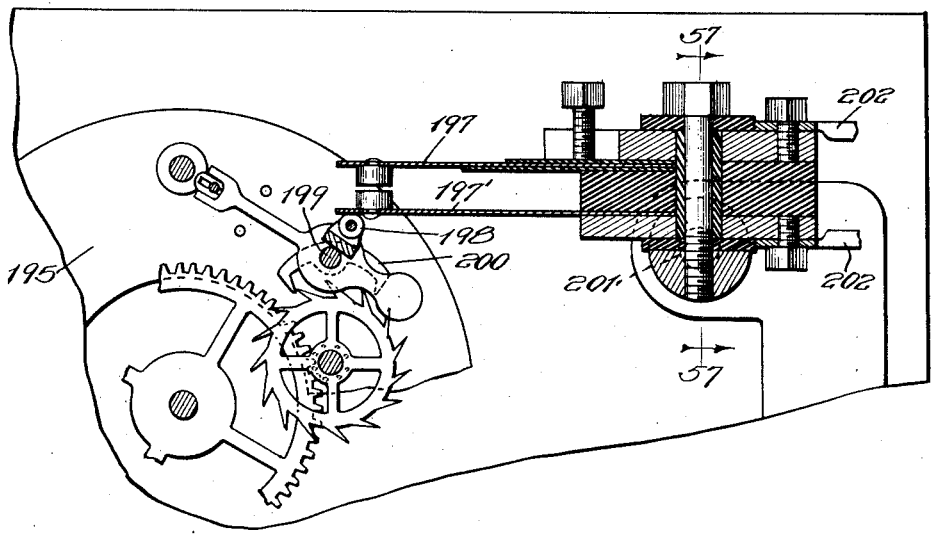
Fig. 56 is an enlarged section on line 56—56 of Fig. 55.
Figure 57:
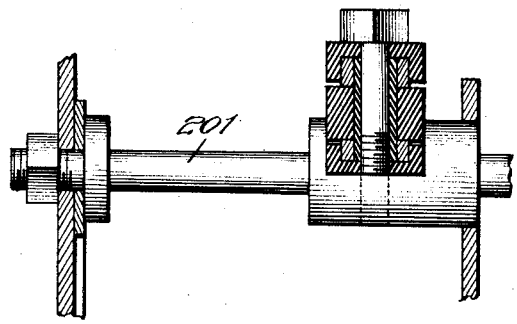
Fig. 57 is a section on line 57—57 of Fig. 56.
Figure 58:
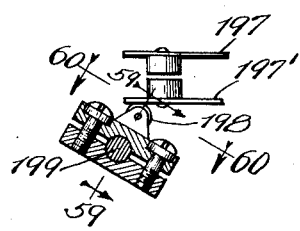
Fig. 58 is a section on line 58—58 of Fig. 60.
Figure 59:
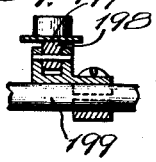
Fig. 59 is a section on line 59—59 of Fig. 58.
Figure 60:
Fig. 60 is a section on line 60—60 of Fig. 58.
Figure 61:
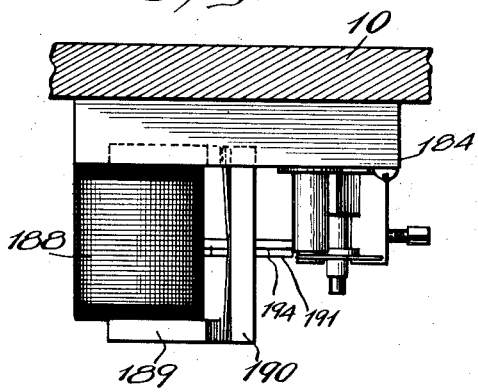
Fig. 61 is a plan section of the gasoline feed on line 61—61 of Fig. 8.
Figure 62:
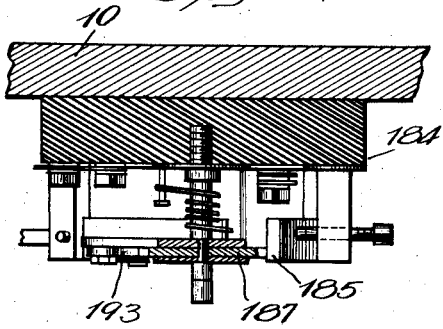
Fig. 62 is a plan section on line 62—62 of Fig. 8.
Figure 63:
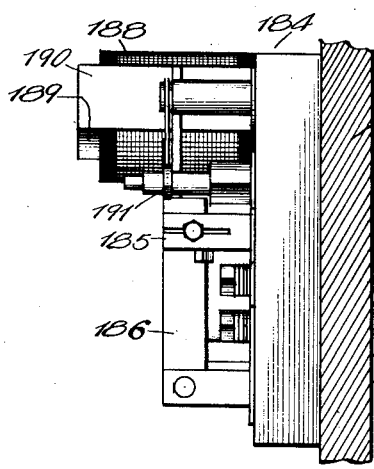
Fig. 63 is a section on line 63—63 of Fig. 8.
Figure 64:
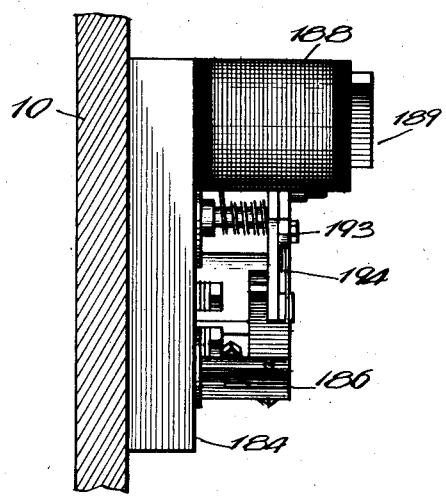
Fig. 64 is a section on line 64—64 of Fig. 8.

A spring member 90 is positioned so as to bear against the opposite face of the gear 87 to control its clutching and declutching engagement with the worm wheel 83, said spring having a pin or other suitable abutting part 91 at its upper end, said pin being fixed to the part 90 and slidably mounted in the frame wall of the gear casing so as to be pressed in the direction shown by the arrow in Fig. 47 to slide the gear 87 into engagement with the clutch face 89 of the worm wheel 83. A second worm 92 intermeshes with the gear 87, as shown in Fig. 45, said worm being fixed to a substantially vertical shaft 93, said shaft having a gear 94 at its upper end. A worm wheel 95, carried by a shaft 96 parallel to and above the shaft 84, intermeshes with the gear 94, said shaft having a clutching member 97 at one end similar to the clutch 85 on shaft 84, as shown in Fig. 47. Either of the shafts 84 or 96 are adapted to be rotated by a coupling plug member 98, said coupling plug member being recessed or hollowed out at its inner end, the bottom of said coupling member being adapted to bear against and actuate the pin 91 and the spring 90 to slide the gear 87. The coupling plug part 98 is stationary, or acts as a casing or journal for a rotary shaft 100 carrying a drive part 101 at its inner end, said drive part 101 adapted to engage the clutch face of either of the clutches 85 or 97, as desired, the outer end of said shaft 100 having a coupling part 102 thereon adapted to be detachably engaged by a flexible drive shaft or other suitable device for driving from the rotary parts of the device to be tested.

Sockets 103 and 104 surround the shafts 84 and 96 respectively, said sockets being adapted to yieldably hold the drive coupling parts 98, 100 and 102 in position, said sockets having radial recesses therethrough adapted to receive bars 105 yieldably held together by a spring 105′ (Figs. 44–47), the part 98 having annular channels 106 therein, into which said contractile bars are adapted to engage.

Thus it is seen from the above explanation that the shaft 44 may be rotated through either of the shafts 84 or 96, as desired, one of said drives being at one-sixtieth the speed of the other. As shown, the drive through the shaft 96 is one-sixtieth of the speed of that through the shaft 84.

When the device is connected up as shown in Fig. 47, the worm 95 will be driven, said worm rotating the gear 94 and the worm 92, the worm 92 in turn driving the gear 87, and the gear 87 being directly connected with the worm 83 by the engagement of the clutching faces 88 and 89, rotates said worm 83 to drive the wheel 82 and the shaft 60.

In case the drive is desired to be transmitted at a speed sixty times greater than that previously explained, the coupling parts 98 and 102 can be connected up so as to fit within the socket 104, driving the shaft 84 and the affixed worm 83. Inasmuch as the gear 87 is freely rotatable on the shaft and the clutch faces 88 and 89 are out of engagement, as shown in Fig. 44, the drive will be transmitted from the worm 83 to the wheel 82 and thence to the shaft 60. A spring 104′ is positioned at each of the clutches so as to permit the ratcheting thereof, when the drive is reversed.

Figure 5:
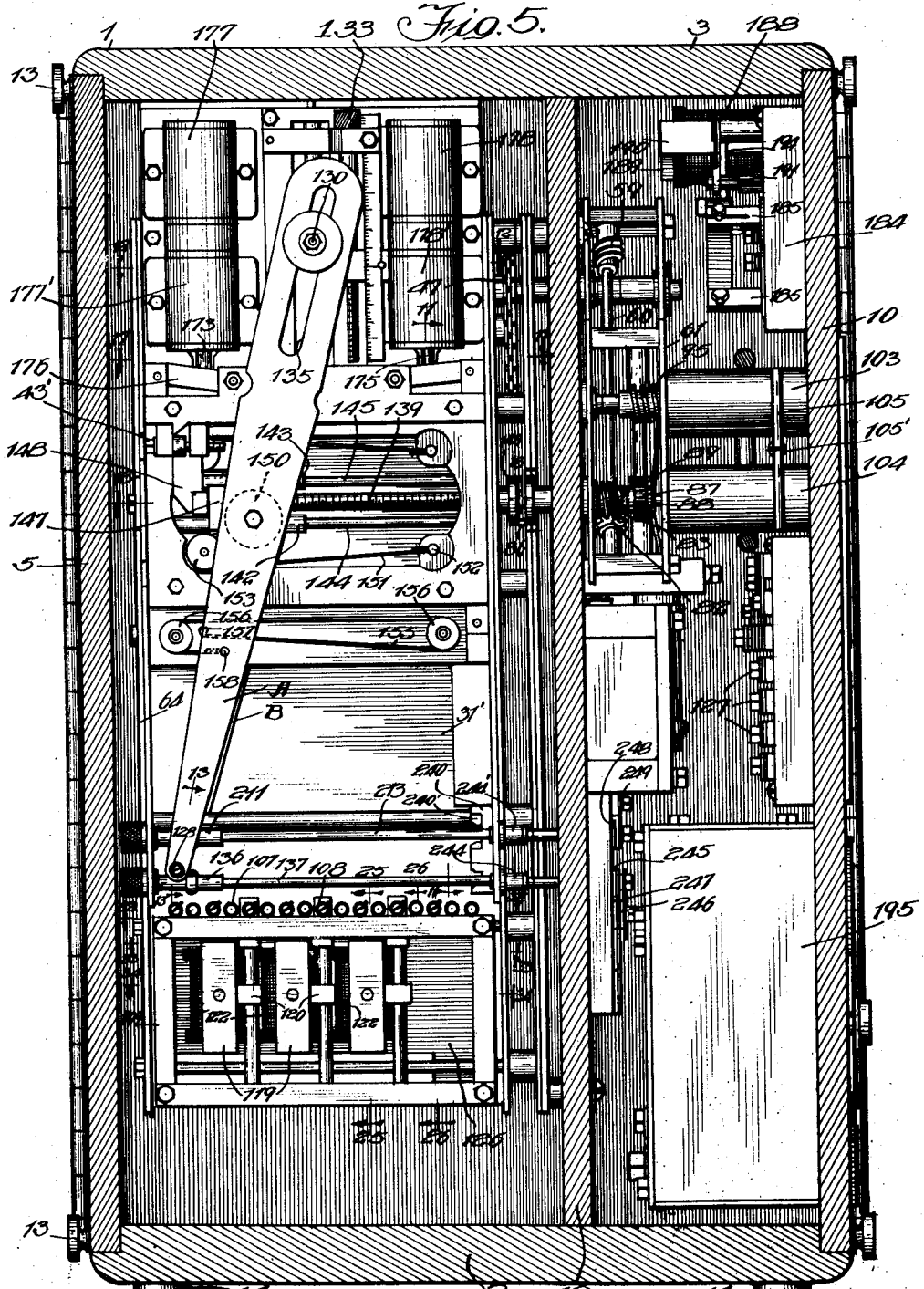
Figure 6:
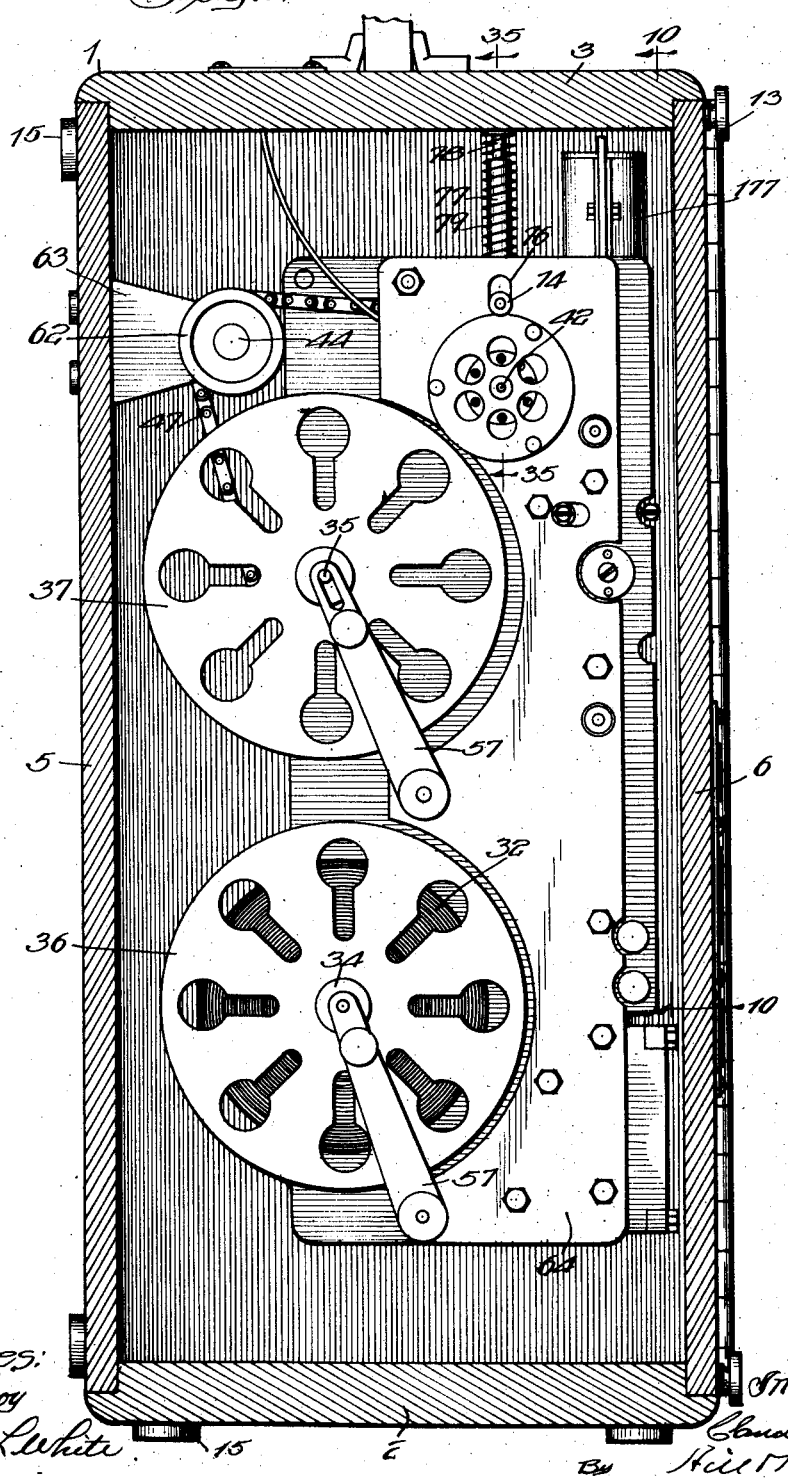
Figure 7:
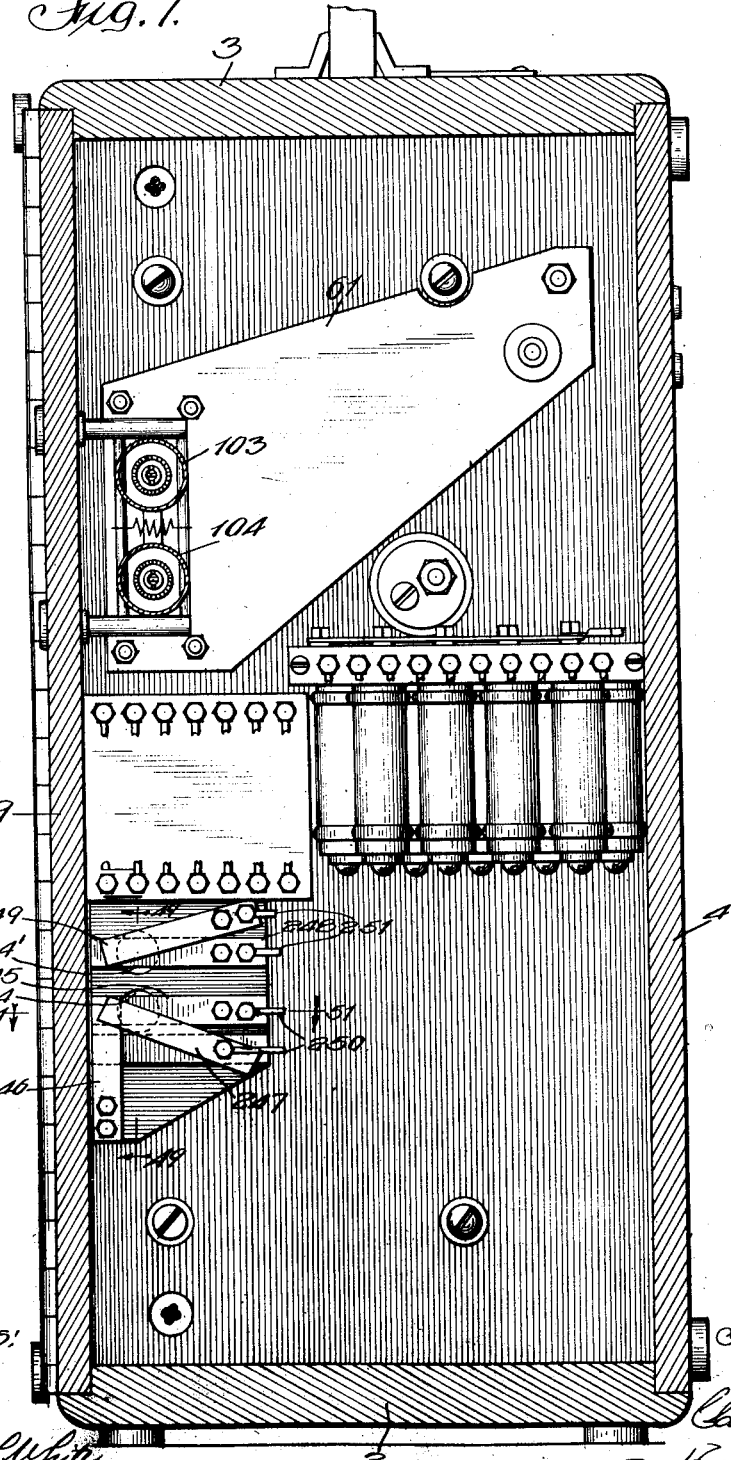
Figure 32:
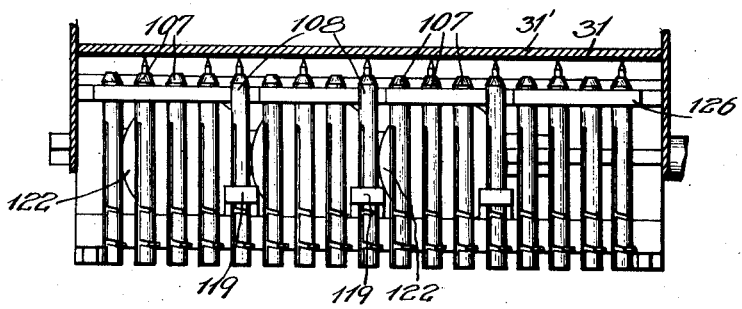
Fig. 32 is a plan section of the pencil shown on line 32—32 of Fig. 5.
Figure 33:
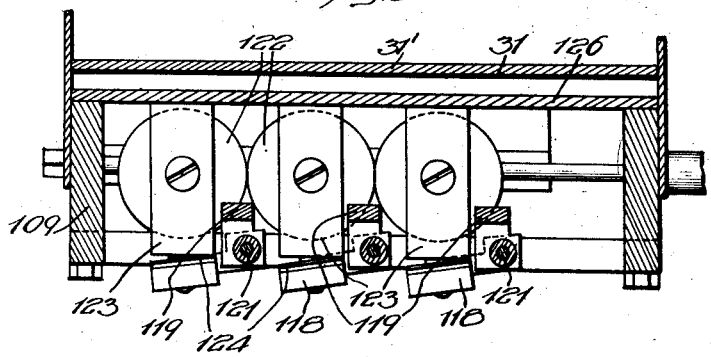
Fig. 33 is a plan section on line 33—33 of Fig. 5.
Figure 34:
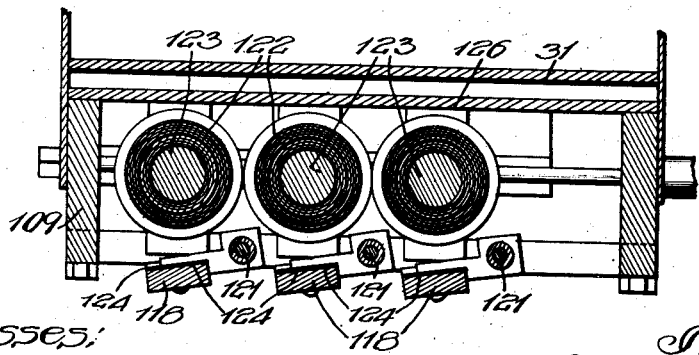
Fig. 34 is a section on line 34—34 of Fig. 5.

The mechanism for marking the scale lines as the chart is unrolled from the supply roll 32, comprises pencils or other equivalent marking means 107 and 108, as shown in Figs. 5, 27 and 32, spaced at any predetermined distances apart, as for instance one-quarter inch in the particular embodiment shown, though it is not necessary to have uniform spacing, the spacing apart of the pencils being equivalent to a predetermined unit, as for instance, each one-quarter inch or other distance may represent five miles per hour, or five miles per gallon of fuel, etc., depending on what is recorded. It is not necessary nor generally desirable to use leads in all of the pencils, but in actual practice the ten-mile lines are drawn and the extra leads are inserted in case tests are being made between any given ranges, say five to thirty miles per hour. This gives reference lines which permit the immediate comparison of tests. The pencils 107 are, as shown, stationary relatively to the chart, while the pencils 108 are pivitally mounted so as to be moved relative thereto for the purpose of designating upon the chart at any predetermined point characters in code which indicate, as for instance, the beginning of the test, the end of the test, passing a given point, recording distance marks, climbing of a hill, or any other predetermined or desired indications. The pencils are mounted in a stationary frame 109, and each comprises a holder 110 having a longitudinal slot 111 in the wall thereof, the lead 112 being frictionally held in a sleeve 113 and pressed forward by a resilient spring 114. The rear end of said spring is adjustably tensioned by a plug 115, having a lug 116 projecting laterally therefrom and engageable in a series of recesses 117 offset laterally of the main slot 111, whereby the plug may be adjustably held at either of the spaced slots 117, as shown in Fig. 28.

There are three movable pencils 108 shown in the drawings, see Fig. 5, covering various speed ranges across the chart, each of said pencils 108 being held by a bracket 118 having end portions 119 transversely thereof, the brackets pivotally mounted at 120 to a pivot rod 121 secured to the frame 109, said pencil being adapted to be pivoted in a horizontal plane. The pivoting of the pencils 108 is effected by an electromagnet 122 having a core 123 at its ends adapted to cooperate with the portion 119 of the bracket, the portion 119 acting as an armature, see Figs. 25, 26, 33 and 34, said electromagnet being mounted on the rear wall 126 of the frame 109. The pivotal axes 121 of the pencils are offset from, or to one side of, the armature portions 119 of the electromagnet, so that when said electromagnets are energized, they will cause the brackets 118 to be swung about said pivots 121, there being springs or other suitable resilient means 124 between said armatures and brackets to automatically return said pencils to their normal position.

Figure 8:
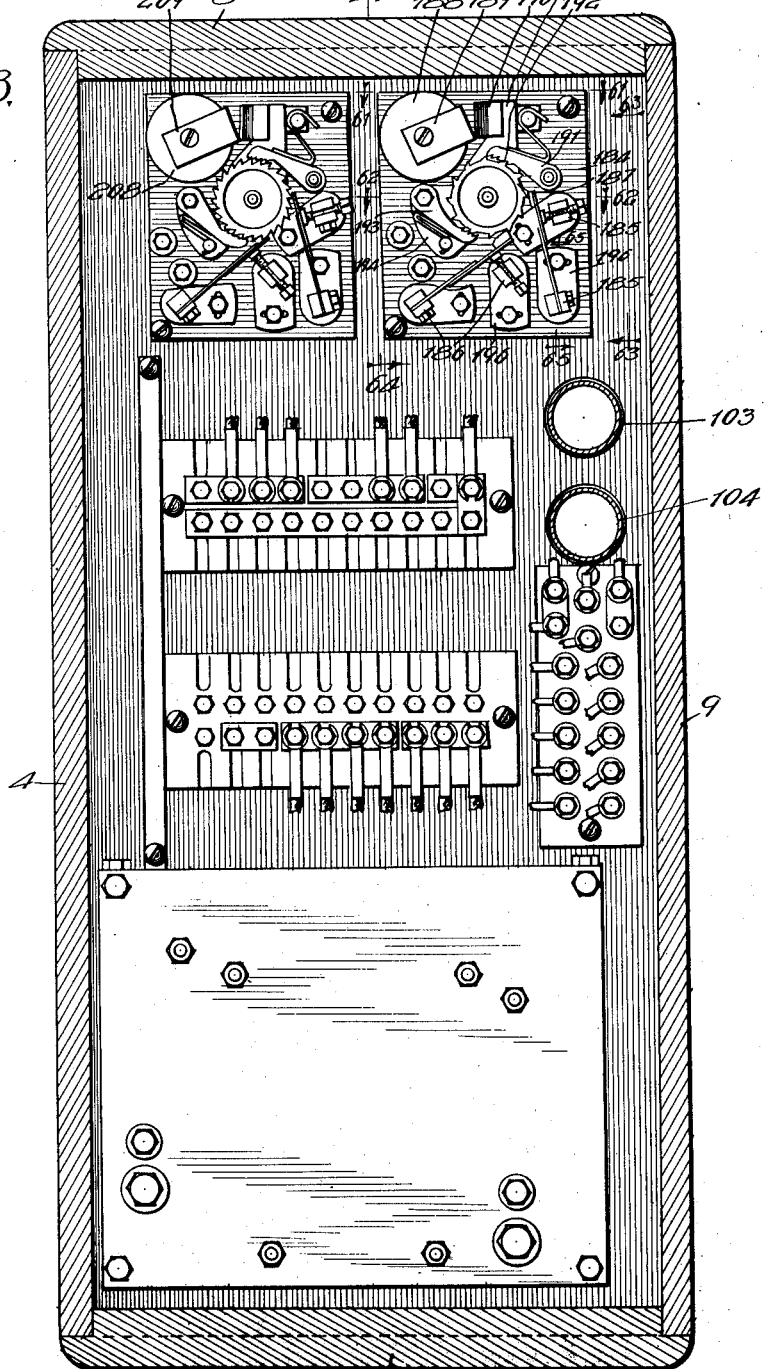

The lead wires for energizing the electromagnets 122 are indicated at 125, said lead wires being connected to any suitable source of electrical energy, as for instance batteries, and adapted to be actuated by push buttons 127 having receptacles arranged at the exterior casing of the device, as shown in Fig. 8. Thus, while the chart is in motion and it is desired to designate or mark any portion of the length thereof as distinct from the remaining portions, buttons 127 controlling the respective electromagnets 122 are pressed to close the respective circuits, swinging the respective pencils 108 about their pivot points and drawing a line on the chart transverse to the normal scale lines. The continued holding of the button 127 in its closed circuit position will cause a line to be imprinted on the chart parallel to the scale lines, and the termination of the pressing of the button will cause the pencil to mark another line on the chart at right angles to the scale lines. In other words, the marks made on the chart by the opening and closing of the circuit controlling the electromagnets 122 will be in the form of brackets of varying sizes, depending upon the length of time of holding the circuits closed. By using a code of long and short offsets, a variety of incidents can be recorded, and be perfectly identified at any time directly from the chart itself, without additional notes.

It will be noted that the scale lines are drawn as the record is being made, and that the pencils or the equivalent tracing these lines are substantially close to the curve tracer, so that the possible moving of the chart or paper from one side to the other does not affect the accuracy of the record. This is important, as otherwise there would be difficulty in getting the scale lines to register, and there is always a question in interpreting the record of its accuracy with regard to the base line. This difficulty has been entirely eliminated by my improved construction.

The velocity plotting arm A, carrying a tracer pencil 128 at its lower end (see Figs. 5, 10 and 12) is pivoted at its other end as at 130 to an adjustable synchronizer slide 131, said upper end of the plotting arm having an elongated slot 135 formed therein so as to be adjustable in its effective length relative to the synchronizer slide. When the synchronizer slide is fixed in one position, a certain movement of the plotting arm actuating means will move the tracer pencil a fixed distance thereover, while if the synchronizer slide is moved downwardly, the same movement of the plotting arm actuating means will move the tracer a greater distance; while if the synchronizer slide is moved upwardly, an equal movement of the plotting arm actuating means will cause the tracer pencil to move a lesser distance. This feature is extremely important because it is necessary to synchronize the travel of the tracer pencil so that the distance traced on the chart represents exactly the distance moved by the wheel on the ground, regardless of the diameter of said wheel, and the adjustment provided for in the instrument herein described will take care of wheel diameters covering a wide range of sizes. Without this method of synchronizing, it would be necessary to measure up and replot each record from cars with varying wheel diameters in order to reduce them to an exact scale and compare them directly.

This synchronizing adjustment is made directly from the measured rolling circumference of the wheel, as explained later, and corrects for all variations in tire diameters, conditions of wear or degrees of inflation.

The rolling circumference of the front wheel is the factor that is to be recorded and it necessarily varies with different wheel diameters, tire diameters, kinds of treads, conditions of wear, and degrees of inflations. In order to compensate for all of these variations, the rolling circumference of the wheel is measured accurately by attaching a marker (not shown) to the tire, said marker consisting of a small chain and a coil spring (not shown) which can be hooked around the tire. The coil spring holds the chain tight so that as the wheel is rolled on the ground the chain does not shift its position. A steel tape (not shown) graduated in feet and hundredths is laid on the ground with the end of tape even with the marker. The wheel is turned so that the marker is at the bottom and the car is then pushed forward one complete revolution of the wheel and a reading taken at the point where the marker strikes the tape. It is desirable to check this measurement two or three times and in case there is a variation in the different readings the results are averaged. This gives the exact distance traveled by the car for each revolution of the wheel, which distance is used in synchronizing the plotting arm A, as will now be described.

To use a concrete example, let us assume that the rolling circumference of the wheel was found to be 8.39 feet. If the car travels 10 miles per hour, it moves 14.666 feet per second, which means that this particular wheel would turn 1.747 turns per second at 10 miles per hour, or 10.46 turns per second at 60 miles per hour. A driving screw 139, to be hereinafter described, is geared directly to the front wheel so that it makes a corresponding number of revolutions therewith. For the purpose of setting the synchronizer slide 131 for a given diameter of a wheel, a dividing head (not shown) is removably mounted temporarily on the left end of the driving screw 139 and reads directly in hundredths of a revolution so that 10.46 turns of the screw 139 (and of the front wheel) can be accurately measured thereby. This dividing head is then turned for 10.46 turns, the same turning the screw 139 the same amount, and as the screw 139 is connected to the tracer pencil 128, it will move said tracer pencil across the chart and the length of the line drawn thereby should be 60 miles on the scale, or, in the form shown, should be exactly 6 divisions on the scale. If the mark drawn by turning the screw 139 the predetermined number of turns is less than the required 60 miles on the scale, the synchronizer slide 131 is moved down by means of an adjusting screw 133 to shorten its length from pencil end to pivot. If the line drawn is more than 60 miles, the slide is moved up. Obviously, the pivot nuts 130 must be loosened while this adjustment is made. Two or three trials are usually sufficient for calibration, after which the pencil will move the exact distance of 60 miles on the chart for the 10.46 turns of the screw. This fixes the correct pivotal center 130 of the plotting arm so that the distance moved by the car on the road is transferred in exact proportion to the chart for a wheel with a rolling circumference of 8.39 feet. Calibrations for any other size wheel are made in a like manner.

The velocity curve tracer lead holder 136 is pivotally connected to the lower end of the plotting arm A (see Fig. 5) and comprises a sleeve slidable on a fixed shaft 137, said tracer pencil holder having a roller 138 thereon to cooperate with the safety release of the plotting arm actuating means, as will be hereinafter described.

The driving member for actuating the plotting arm (see Figs. 5, 10 and 17–24) comprises a rotatable screw or worm 139 (left hand threaded in the embodiment shown), and preferably having its driving side straight and with a forty-five degree angle on the other side, so that there is no tendency for the cooperating driving nuts to slip out of engagement. One end of the driving screw 139 has an enlarged coupling head 140 provided thereon, there being a laterally projecting coupling pin 141 carried thereby, whereby the coupling heads 140 and 86 may be drivingly interconnected. Adapted to alternately engage with the driving screw 139 are a pair of driving nuts or racks 142 and 143, one substantially on each side of the screw and spaced apart a distance slightly greater than the diameter of the screw, the threaded faces of said racks being less than one-quarter of the circumference of the threaded exterior of the screw, so that at least four such racks or nuts may be arranged about the periphery of said driving screw.

The worm-driven nuts or racks 142 and 143 are slidably mounted upon stationary shafts 144 and 145 respectively, and have lugs 146 and 147 respectively projecting therefrom in spaced parallel vertical planes, whereby said lugs may pass each other without interference, said lugs being adapted to bear against an abutment stop 148 in their non-driving or neutral disengaged position, as shown in Fig. 5.

Pivotally mounted upon the plotting arm A (see Figs. 5, 10 and 17–24 inclusive) is a roller 150 adapted to be engaged by said lugs 146 and 147 whereby said plotting arm is actuated. A stop screw 43' controlling the movement of abutment member 148 is adjustably positioned on the frame, so as to adjust the member 148 to engage with said racks and adjust the zero position of the plotting arm. The racks 142 and 143 carry vertically projecting lugs 159 and 160 respectively, adapted to slide in guide grooves provided in the frame work of the device to prevent the rotation of said racks. The racks are so mounted on the opposite side of the driving screw and so spaced, that when one engages on one side of the driving screw, the other is free on the other side and is returned to the stop by a return band 151, said return band being secured at one end 152 to the frame, and passing over a rotatable roller 153 fixedly secured at the opposite side of the frame, the other end of said band being secured to a hooked projection 154 on the racks. The band 151 is of an elastic material, preferably rubber, so that when the driving engagement of the screw and rack are released, the band will retract the driving rack against the stop to its initial or zero position. These racks are the driving medium between the screw and the plotting arm, and when one rack is engaged and being carried toward the right, the other is free and has been returned to the stop 148 ready to immediately engage the screw when the other rack is disengaged.

In order to return the plotting arm to its zero position after each outward movement or actuation thereof, I have provided an elastic band 155, one end 157 being secured to a fixed point and passing over rollers 156, the opposite end of said band being secured at 158 to the plotting arm A, as shown in Figs. 5 and 10, so that when the driving nut is released, the band 155 will retract the plotting arm to its zero position.

The velocity plotting arm control frame 161 (see Figs. 10 and 23) comprises a pair of upright members 165 and 168, mounted in suitable guides in the container so that they are slidable up or down in the direction of the paper feed. Intermediate their ends they carry a pair of bored lugs 163 for the ends of the shafts 144 and 145. These arms are spaced apart and carry pins 164 at their upper ends and are linked together by a pair of levers 176—176', said pair of levers being pivoted together at their inner ends by a pin 167 so as to be slidable relative to each other, the outer ends of said levers having slots 166 therein adapted to interengage the pins 164.

Intermediate the pins 164 and 167 of the levers is a pin 170, said pin being adapted to be engaged by the arm 176', one end of said arm 176' being pivotally secured to a reciprocating solenoid plunger 173, said arm 176' being enlarged so as to loosely encircle the pin 170, so that reciprocation of the plunger 173 causes the entire velocity plotting frame assembled with the driving nuts to be reciprocated, the shifting force applied to the frame acting equally at both ends and moving the assembled mechanism without binding or misalignment, regardless of the position of the driving nuts 142 and 143.

The means for controlling the movement of the plunger 173 (see Figs. 5, 10 and 11) consists of two separate solenoids 177—177' mounted in axial alignment and through which the plunger 173 slides. When one of the solenoids is excited by an electric current, its magnetic lines draw the plunger toward it until one of the racks engages the driving screw 139, where it is held in contact as long as the current passes through that solenoid. As the current is broken and is passed through the second solenoid, the plunger is immediately drawn in the opposite direction until the opposite rack engages with the driving screw, where it is held in contact as long as the second current continues. The length of the plunger 173 is very important and is so determined that it gives the maximum magnetic pull at the instant when the circuit is broken in one solenoid and made in the other, after which the magnetic force becomes less until the rack engages, so that the force holding it in place is small enough not to induce any frictional loss. In order to alternately energize the solenoids 177 and 177' at periodic intervals, I have provided a control relay 184.

The velocity plotting arm control relay 184 is mounted in the back of the case, as shown in Fig. 8, and consists of two pairs of contact points 185 and 186, respectively, which control the circuits to the two solenoids 177 and 177', said contact points being operated by a ratchet wheel 187 so constructed that one circuit is closed at the instant the other circuit is broken, the making of one circuit and the breaking of the other following in regular succession as the ratchet wheel is rotated tooth by tooth in one direction. The ratchet wheel 187 having teeth 192 is advanced at regular intervals by the action of an electromagnet 188 having a core piece 189 which actuates an armature 190 mounted on a plate 194 which carries a pawl 193 engaging said ratchet wheel, said pawl having four teeth, the distance between first and last tooth being equal to the distance between two teeth of the ratchet wheel. A second pawl 191 mounted on the base of 185, holds said ratchet wheel in its advanced position after each successive step, while the pawl 193 carried by the armature drops back to a new position. The second pawl 191 has the same number and spacing of teeth as the pawl 193, whereby in the present instance, due to the chronometer being of the 120 beat type, each movement of the armature will advance the ratchet wheel one-fourth of a tooth, or in other words, four oscillations of the armature will advance the ratchet wheel one tooth, which movement is required to break one circuit and make the other, so that a complete cycle requires four oscillations of the armature, the cycle being the advancement of the ratchet wheel on the teeth, thereby making and holding one circuit one second, and simultaneously breaking the second circuit for one second, the breaking of the first circuit one second, and the simultaneous making and holding of the second circuit one second.

Figure 65:
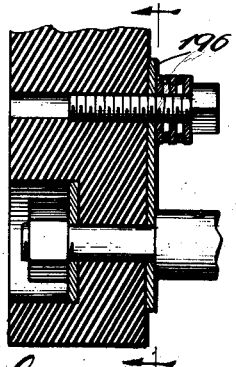
Fig. 65 is an enlarged section of the adjusting lock for the spring, taken on line 65—65 of Fig. 8.
Figure 66:
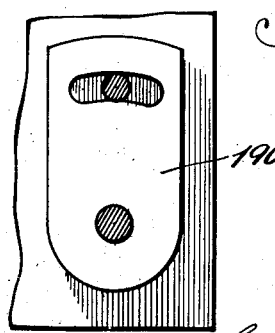
Fig. 66 is a section on line 66—66 of Fig. 65.
Figure 70:
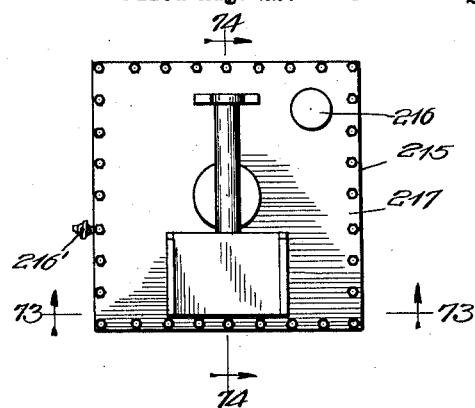
Fig. 70 is a plan view of the gasoline tank.
Figure 71:
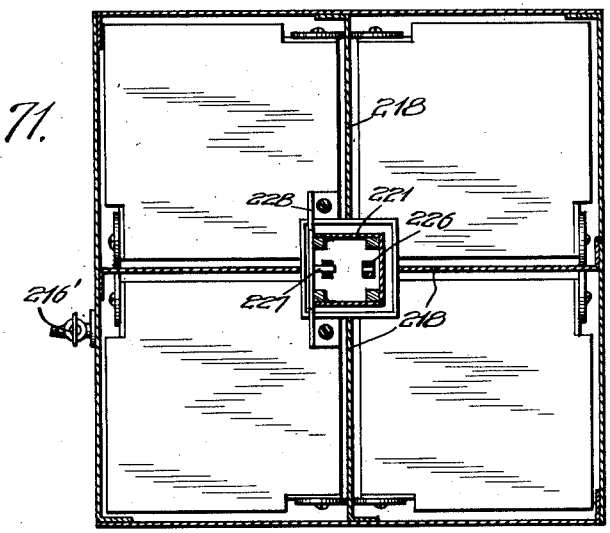
Fig. 71 is a plan section on line 71—71 of Fig. 83.
Figure 72:
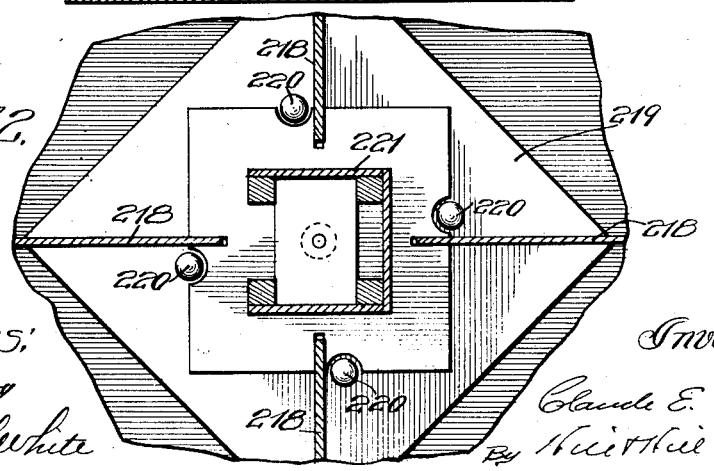
Fig. 72 is an enlarged plan section on line 72—72 of Fig. 73.

The electrical contact members 185 and 186 are adjustably mounted relative to the ratchet wheel by providing an adjustable base 196, as shown more clearly in Figs. 65 and 66.

The control relay 184 is in turn electrically actuated and controlled by a chronometer 195.

The chronometer 195, shown in Figs. 54 to 60 inclusive, for operating the relay 184 which controls the movement of the solenoids 177—177', may be of any preferred or desired construction, and has mounted on it a pair of contact points 197—197' supported on a rod 201. One of said contact members, as for instance the member 197', is mounted on a spring which bears on a small roller cam 198, which in turn is mounted on a rocker shaft 199 of the escapement 200, the lead wires from the contact points 197—197' being indicated at 202. Each complete oscillation of the rocker shaft 199, that is, from one side to the other and back to the first side, makes and breaks the circuit once, because as the chronometer used in the instrument described is of the 120 beat type (120 beats per minute), said circuit is made and broken twice in each second. As the circuit controlled by the contact 197—197' controls the electromagnet 188, it is apparent that this magnet is energized twice per second, the armature 190 being attracted when the circuit is made and returned when the circuit is broken, in readiness to be moved forward again.

It will be remembered that the relay 184 controls the solenoids 177—177', which in turn controls the reciprocation of the shifting frame 161, so that as the solenoids 177—177' are alternately energized, one driving rack is held in engagement with the driving screw 139 for one second, after which it is released and the second driving nut which has already returned to the stop, is instantly engaged and starts to travel forward before the other driving rack reaches the stop, the second driving rack remaining engaged during the next second. The shifting operation controlling the engagement and disengagement of the driving racks is repeated as long as the instrument is connected up and operated. The action of the two driving racks results in the plotting arm being actuated first by one rack and then by the other, the plotting arm dropping back substantially to its initial or to an intermediate position after each driving rack is released, and is picked up against by the opposite driving rack and carried forward until the end of the next second, etc.

Under certain conditions it is desirable that the velocity plotting arm A should record the velocity at minute intervals instead of the velocity at second intervals, so that, therefore, it is necessary that the solenoids 177—177' be operated at minute intervals to shift the frame 161 accordingly. For this purpose I have provided a pair of contact arms 203—203' adapted to engage a cam 206 driven by the chronometer mechanism (see Fig. 54), whereby the circuit is made and broken twice each minute, the lead wires from said contact members 203—203' being indicated at 207, and leading to one of the pairs of contact arms 185 or 186 of the relay. The contacts 203—203' are supported in any suitable manner, as for instance by a rod 205 secured to the frame.

The plotting arm A makes the velocity curve D, as well as the velocity curve C upon the chart, the only difference between the velocity curve D and the velocity curve C being that the former is made with minute time intervals and the rate of paper feed is one-sixtieth of that used in making the curve C. The values read directly to the same scale, and the operations throughout are the same as that described for the action of the arm making the curve C, except that the minute contacts on the chronometer are used instead of the second contacts.

In addition to the charting of velocities, my mechanism is arranged so as to plot fuel consumption, the plot being designated in Fig. 82 as curve E. The fuel consumption is only plotted when curve D is being plotted.

The fuel plotting arm B makes a fuel curve on the chart simultaneously with the making of the velocity curve D. The fuel curve E is a zig-zag curve similar to the velocity curves, but with a different number of peaks, each peak representing the use of a given increment of fuel, and the height of the peak representing miles per gallon, the curve E being drawn to exactly the same scale as that used for the velocity curves. The range required is not nearly so great as for the velocity curve, so that only a small part of the chart is covered by the fuel curve, the average range being from five to twenty-five miles per gallon. The fuel curve tracer B is an exact duplicate of the velocity plotting arm A, except that it is mounted on the opposite side of the plotting arm assembly (see Figs. 5 and 9–13). The curve tracer pencil 129 is set one-quarter of an inch above the pencil 128, and the pivot for the plotting arm B, which corresponds to the pivot 130, is mounted on the opposite side of the synchronizer slide 131 and one-quarter of an inch above, so that the operation of the setting of the synchronizer slide 131 for any given wheel diameter automatically takes care of the setting of the fuel plotting arm B, as far as the proportion is concerned. The stop for the fuel plotting arm is similar to that for the velocity plotting arm, and must be set independently in the same manner as the stop for the arm A, said stop being mounted on the side of the frame opposite to that for the velocity plotting arm.

The fuel plotting arm driving nuts 142' and 143' are exact duplicates of the velocity plotting arm nuts 142—143, except that they are mounted on the opposite side of the drive screw (see Fig. 20), said racks being slidable upon rods 144' and 145' similar to the rods 144 and 145 previously described, and having a roller 213' on the tracer pencil (see Fig. 9).

The fuel plotting arm control frame 159' is an exact duplicate of the velocity control frame 161 and comprises a pair of slidable uprights 162 and 169 having lever arms 174 and 165' respectively, pivoted thereto and pivotally interconnected with each other, the arm 174 being controlled by a solenoid plunger 175 of a pair of aligned solenoids 178 and 178' similar to the solenoids 177 and 177' (see Fig. 10).

The fuel used for the test is kept in a container 215 mounted at any suitable point, (see Figs. 70–78) and comprises a casing having an inlet 216 at its top and an outlet 216' at its bottom, the top cover 217 being removably secured to the casing, whereby the interior of the meter case may be easily cleaned or repaired. The meter case is preferably divided into a number of chambers extending vertically thereof, so that there will be a minimum amount of splashing and tilting of the body of the fuel and thus secure a true reading, said dividing walls or partitions being indicated at 218, same being secured at their bottom ends to a reinforcing plate 219, which is attached to the bottom wall of the casing by rivets 220 or the like. Centrally of the casing and extending from top to bottom thereof is a chamber 221 having a sprocket wheel 225 rotatably mounted at the lower end, said sprocket wheel being arranged to receive a chain 226. The float assembly comprises a plurality of floats 223—223', one float fitting into each of the subdivided chambers and held in place by a frame member 222, surrounding the chamber 221, said frame member having an offset part 228 adapted to engage one end 227 of the chain 226, so that as the float frame rises or falls, it will actuate the chain 226. The chain at its upper end passes over a second sprocket wheel 229, fixed to a revoluble shaft 230 in bearings 231, said shaft carrying at one end a ratchet wheel 232 adapted to intermittently engage a pair of contact members 233, thus acting as a circuit breaker. The contacts 233 have terminals 234 one of which is adapted to be connected to a source of electrical energy, as at 300 (see Fig. 30) and the other connected to a relay 208, similar to the relay 184 (see Fig. 8). As the float in the fuel chamber falls due to the fuel being used, the movement makes and breaks the circuit control contact members 233.

The relay 208 controlling the solenoids 178—178' is mounted adjacent the relay 204 (see Fig. 8) and is similar thereto, except that its ratchet wheel has twice as many teeth, so that one oscillation of the armature actuated by the solenoid 209 of the relay 208 advances the ratchet wheel one-half a tooth. That is, the circuit is made in each coil of the solenoid 178—178' once for each two oscillations of the armature.

The pencil 129 is actuated for an interval corresponding to the time necessary to use up one increment of fuel, that is, to move the notched wheel 232 one tooth forward, and the height of the peaks drawn by the pencil will be directly proportional to the number of increments used up, because the notched wheel will rotate faster at a high rate of fuel consumption and slower at low consumption, thus actuating, or making and breaking the driving relay solenoids faster or slower, as the case may be. If the solenoids are made and broken in quick succession it is obvious that the peaks drawn by the pencil will not be high—indicating a high rate of fuel consumption on the chart. If made and broken slowly the peaks will be higher—indicating a low rate of consumption.

The consumption of an increment of fuel moves the notched or ratchet wheel from one tooth to the next, and which thru the relay, releases the plotting arm, and the highest point on the chart scale represents miles per gallon. The next increment of fuel again actuates the relay 208, which again energizes the solenoid 209, again releasing the plotting arm C. The distance that the car travels for an increment of fuel is readable as the height of the peak on the chart and the number of the notches in the wheel 232 is calculated, in connection with the chart scale and the increment of the fuel used, so as to give the proper reading on the chart directly in miles per gallon.

In order that the plotting arms A and B shall not over-run the chart, I have provided safety releases for these arms, one of these safety releases being mechanically operated, and the other electrically operated. Depending from the frames of the upright members 168 and 169 of the shifting frames (see Fig. 23) are a pair of uprights 240 and 240' connected at their upper ends to the uprights 168 and 169 by a pin 241. The lower end of the depending upright 240 is slotted at 242 and 243, said slots being spaced one below the other, and one of them, as for instance slot 242, being wider than the other. The upright 240' is similarly slotted at 242' and 243', the larger slot of the member 240' cooperating with the small slot of the upright 240, as shown, the other pair of slots cooperating in a like manner.

Assuming that the plotting arm A is being actuated toward the right, then in case the driving racks actuating it are not released before the plotting arm reaches the end of the chart, the roller 138 carried by the lower end of the plotting arm will engage in the slot 243 of the upright 240, (see Figs. 5 and 11–16) raising the shifting frame to a central or mid-position, whereby both the upper and lower driving racks are disengaged, thus permitting the plotting arm to be returned to its initial position. The plotting arm B acts in a like manner, a roller 212 carried thereby engaging in the slot 243' to raise the shifting frame to a central position and disengage the driving racks.

In addition to the mechanical safety release, there are provided cut-out switches 244 and 244' at the limit of the driving movement of the plotting arms A and B respectively, (see Figs. 5, 7, 49–53) said switches being actuated by sleeves 136 and 211 respectively, at the ends of the plotting arms.

The safety switches 244 and 244' comprise slidably mounted members 252, adapted to be actuated by the sleeves 136 and 211 respectively. 248 and 249 indicate the contact members of the release switch 244', while contact members 245, 246 and 247 are similarly provided for the release switch 244. These contacts of the release switches 244 and 244' are connected by suitable lead wires 250 and 251 through batteries to the solenoids 177 and 177' and 178 and 178' respectively, so that when the circuits of the release switches are closed, as shown in Fig. 50, the solenoids are energized to shift the control frames in the opposite direction to that in which they are positioned.

From the preceding description it will be noted that the apparatus is both mechanically and electrically operated and controlled, the various mechanisms working in conjunction to produce the desired results. The various electrical circuits are shown diagrammatically in Figs. 79 and 80, but in this connection I have not shown in the diagram all of the apparatus in detail, as for example the safety stops, as well as the condensers and resistance coils, etc., which may be employed if desired. I have not considered it necessary likewise to show in these figures all the terminals for these various features, nor the mechanical apparatus, but merely the terminals therefor. Figs. 79 and 80 should be read together, and in this connection in Fig. 79 there is shown the inside main and push button terminals, while in Fig. 80 is shown the battery or other source of power and terminals at the exterior of the box or casing. These terminals A', B', C', D', E' and F' in Fig. 80 correspond with those shown in Fig. 79. There is also shown diagrammatically in Fig. 80, the push button switches and the fuel meter tank circuit and switch mechanism at the tank.

I will first trace out the circuits having to do with the control of the velocity arm alone, and the operations for plotting the seconds readings, the fuel meter not being employed and no record made of the fuel used.

Referring to Fig. 79, it will be noted that terminals A' and D', C' and F' are bridged, and referring to Fig. 80 when the conductors from battery 300 or its equivalent are plugged in D', E' and F', terminals D', E' and F' on Fig. 79 are connected with the battery. A circuit may then be traced as follows: from E' to 316 to the chronometer or clock mechanism circuit control, terminal 315 through 325, 324, 365, magnet 188, 364, 348, 340, 351 and C', which is bridged with F', and thence to the battery, completing the circuit. Magnet 188 is therefore operated, thereby controlling the circuit breakers, which controls the solenoids 177 and 177'.

As before mentioned, the chronometer used or illustrated is of the 120 beat type, that is, 120 beats to the minute, the circuit being made and broken twice each second. This controls the magnet 188 of the velocity control relay, so that the magnet is energized twice per second, the armature being attracted when the circuit is made, and returned to the stop when the circuit is broken, ready to be moved forward again. As before mentioned, in the description of the apparatus, the relay controls the plotting arm through the solenoids 177, 177', there being two pairs of contact points which control the two circuits, the contact members being operated by the ratchet wheel so that one circuit is closed at the instant the other circuit is broken, the making of one circuit and the breaking of the other following in regular order as the ratchet wheel is rotated tooth by tooth in one direction. The ratchet wheel is advanced at regular intervals by the action of the electromagnet on the armature mounted on the plate which carries the pawl engaging the ratchet wheel, as described. The second pawl mounted on the base holds the ratchet wheel in advanced position after each successive step, while the pawl carried by the armature drops back to a new position. The construction of the pawls and ratchet wheel must be noted because each movement of the armature advances the ratchet wheel one-fourth of a tooth, that is, four oscillations of the armature advance the ratchet wheel one tooth, which movement is required to break one circuit and make the other, so that a complete cycle requires four oscillations of the armature for the advancement of the ratchet wheel one tooth, and comprising the making and holding of one circuit, and the simultaneous breaking of the second circuit, and the breaking of the first circuit simultaneously with the making of the second. This is accomplished by cutting four teeth in each pawl to one tooth on the ratchet wheel.

Circuits are, therefore, alternately made as follows: D', A', 352, 353, 399, and in one instance 177, 400, 406, circuit breaker 363, 347, or in the other instance 177', 398, 362, 361, 345 and thence from either circuit breaker, 340, 350, C', F', back to battery 300. The making and breaking of these circuits controls the solenoids 177 and 177', thereby controlling the movement of the plotting arm. If desired, condensers may be arranged and connected between the terminals 362 and 361, and 406 and 363. Likewise the resistance coils may be suitably connected up between the terminals 361 and 345 or 363 and 347. In the detail drawings, I have shown terminals for making these connections, but have omitted the same in the wiring diagrams.

The electrically controlled safety stop previously described in the apparatus is connected between the terminals 390 and 391. The safety circuit is from D', A', 320, 322, 390, safety stop device, 391, 323, 324 and thence follows the magnet circuit as follows: 365, magnet 364, 348, 340, 350, C', F' to battery. The preceding circuits and electrical apparatus control the velocity arm for the seconds record, the magnet controlling the circuit breakers and the circuit breakers controlling the circuits through the solenoids so that the racks alternately engage with the driving screw, as heretofore described, moving the velocity arm at second intervals.

When the fuel meter is employed and the fuel curve plotted, owing to the small increments of fuel that will be employed per second it is desired to have the recording done at intervals of minutes. In this case the mechanical driving connections are changed, as previously described, so that the driving screw travels one-sixtieth of its speed as it travels when indications are made every second. The electrical controlling mechanism is also varied so as to give indications every minute and operate in conjunction with the screw, and in addition the fuel plotting medium is controlled so as to give a record showing the fuel used in increments, for example—sixtieths of a gallon.

When the apparatus is employed then for recording both velocity and fuel used, the conductors from the battery are plugged in so as to make contact at the terminals A', B' and C', as illustrated in Fig. 80 and Fig. 79 in the drawings. The controlling circuits for the velocity plotting arm may then be traced as follows: from the battery through B', 311, 313, circuit breaker at the chronometer for minutes, terminal 314, 326, 325, 324, 365, magnet 188, 364, 348, 340, 350, C' and to battery, so that the magnet and circuit breakers and the solenoids 177 and 177' are operated as previously described, except at different time intervals, the solenoids becoming alternately active at the end of each minute. The solenoid circuits are as previously traced. The fuel meter circuit is substantially as follows: from the battery through B', 356, 357, 358, 370, magnet 209, 371, 304, 424, fuel meter 427, 303, 340, 350, C' and battery. The operation of the fuel meter obviously controls the operation of the magnet 209, and this controls the circuit breakers controlling the solenoids 178 and 178'. The solenoid circuits may be traced as follows: battery B', 356, 357, 403 and thence through either one of the solenoid circuits as follows: in one instance the solenoid 178, 404, 369, circuit breaker 367, 346 to 340 or solenoid 178', 402, 368, circuit breaker 366, 344 to 340, and terminal 340 through terminal 350 connects with C' and battery. The result is that the mechanically driven screw moves the fuel plotting arm which is connected through one or the other of the racks mentioned with the screw, the engagement of the racks being controlled by the two solenoids working alternately. Condensers and resistances may be inserted as previously described, if desired. It may be mentioned that the purpose of inserting resistances is for different voltage of the batteries, but the use of the resistances may be obviated by so connecting the device to the battery in which only a portion of the battery voltage is used.

As previously mentioned, one or more magnets 122 are arranged to be so controlled that the scale lines may be employed to indicate in code certain data. I have shown terminals 305 to 312 for this purpose, these being suitably connected to the various terminals shown in Fig. 79, so that when the circuit is connected therewith, and having push button or like controlling devices, certain circuits may be opened or closed. These several circuits may be traced as follows: A' or D', 320, 321, 396, magnet 122, 397, 306, push button 305, 341 and 340, 350 to C' or 396, 394, magnet 395, 308, push button 307, 342 and 340, or 394, 392, magnet 393, 310, push button 309, 343 and 340, etc., to C'.

The safety stop circuit may be traced as follows: B', 356, 357, 358, 370, magnet 209, 371, 304, 389, safety device to 388, 303, 340, etc., to C'.

The synchronizing push button for the magnet 188 is arranged in circuit with B', 311, push button 312, 323, 324, 265, magnet 188, 364, 348, 340, etc., to C'.

Referring to Fig. 79, it will be noted that I have shown switches 600 and 602 in the diagram, and in Fig. 83 I have shown substantially diagrammatically how these switches may be arranged so that on plugging in at the contacts the circuits may be controlled. As shown, 600 represents the switch which is arranged to cooperate with the contact 601, the switch and contact being connected with 311 and 313. The pin 604, or the equivalent, is arranged to be operative when a plug is inserted in 312 and break the circuit, as shown in Fig. 83. A second switch 602 is arranged to cooperate with the contact 603, 605 being a controlling member arranged to close the circuit when a plug is inserted in 303. Normally, switch 602 is open, except when a lead or plug is plugged into sockets 303 and 304. Normally switch 600 is closed, except when plugged in 311 and 312. For synchronizing or calibrating purposes, as previously described, a battery plug is inserted in F', E', D', which puts the minute contacts in circuit. Then the synchronizing push button plug is inserted in 311 and 312, which cuts out the minute contacts and the circuit will be closed only by the manual operation of the push button. This gives the operator the manual control of the apparatus which is desirable at this time. When the fuel meter is to be used and is plugged in on 303 and 304, it closes the battery circuit for the fuel meter solenoids 178 and 178' and magnet 209 so that the current is on these only when the fuel meter is plugged in. It is believed that this will be clearly understood in view of the preceding description.

The preceding traces the various circuits. It is believed in view of the previous description of the apparatus that the operation of the fuel plotting arm will be obvious. The circuit breaker at the fuel tank is operated during the use of successive increments of fuel, thereby controlling magnet 209 and solenoids 178 and 178', so that the plotting arm plots the fuel consumption in miles per gallon. It will thus be seen that the device is adapted to plot the speed of miles per hour at second intervals or simultaneously plot speed miles per hour at minute intervals and fuel miles per gallon in increments of fuel, the two being so combined that a direct comparison may be made.

I have previously mentioned how engine revolutions or slippage between the front and rear wheel, or wind velocity, etc., may be recorded. This can be accomplished by attaching a circuit breaker to the engine and one of the push button circuits, or in the second instance attaching a circuit breaker at each wheel and plugging in two push button circuits, or in the third instance using an anemometer and plugging a push button circuit so that relative wind velocity can be recorded coincident with car velocity, the difference being the actual wind velocity.

There are many other uses for the push button circuits which need not be described in detail at this time.

Having thus described my invention, it is obvious that various immaterial modifications may be made in the same without departing from the spirit of my invention; hence I do not wish to be understood as limiting myself to the exact form, construction, arrangement and combination of parts herein shown and described, or uses mentioned.

What I claim as new and desire to secure by Letters Patent is:

1. In an apparatus of the kind described and in combination, a movable chart having scale lines thereon, means operating in conjunction with said scale lines for indicating and recording desired information at definite intervals on said chart, said last-named means comprising a chronometer, a frame movable relatively to said chart, marking means pivotally carried by said frame, means engageable for intermittently actuating said marking means, and electromagnetic means controlled by said chronometer for periodically moving said frame in alternate directions to engage said marker actuating means.

2. In an apparatus of the kind described and in combination, a continuously driven chart movable at a predetermined speed ratio to that of the device being tested, said chart being provided with scale lines, and means operating in conjunction with said scale lines for indicating and recording desired information at definite intervals on said chart, said last-named means comprising a movable frame, a marker arm carried by said frame, a rotary screw member fixed relatively to said frame and driven by the device to be tested, a pair of opposed threaded members carried by said frame, engageable with and adapted to be driven by said screw to alternately engage and operatively actuate said marker arm, electromagnetic means for periodically reversing said frame whereby one of said threaded members engages said driving screw and is actuated thereby to move said marker arm and is released therefrom at the reversal of movement of said frame, whereat the other of said threaded members is engaged and driven by said driving screw and actuates said marker arm, tension means successively engageable with said threaded means to automatically bring them and the marker arm to their initial positions after the release from said screw member, and safety means for releasing said marker-engaging members at a predetermined limit of travel of the marker.

3. In a device of the kind described and in combination, a chart movable at one of a plurality of predetermined speed ratios to that of the device being tested, marking means movable across said chart and at one of two differing speeds, means for selectively driving said chart and marking means at either of said speeds without effecting the movement of the device being tested.

4. In a device of the kind described and in combination, a movable chart, yieldably held marking means for recording the desired information on said chart, a pair of alternately movable marker-actuating means, a movable frame carrying said marker actuating means, a single continuously driven threaded screw connected to a moving part of the device be tested and alternately engageable with said marker-actuating means, means for alternately shifting said movable frame to alternately engage one of said marker-actuating members and screw and release the other of said members, and safety means for releasing said marker at a predetermined point of its travel, said means comprising an abutment controlled by said marker, and an extension carried by said frame and engageable by said abutment to shift the frame to release said screw-engaging means, and permitting the yieldably held marker to move back to its initial position.

5. In a device of the kind described and in combination, a movable chart, marking means for recording the desired information on said chart, a pair of alternately operated marker-actuating means, one of them being stationary while the other is moved, a movable frame carrying said marker-actuating means, a continuously driven threaded screw connected to a moving part of the device to be tested and alternately engageable with said marker-actuating means, means for alternately shifting said movable frame to alternately engage one of said screw-engaging members and release the other of said members, and safety means for releasing said marker at a predetermined point of its travel, said means comprising an abutment carried by said frame, and electrical switch means engageable by said abutment and operable to release said marker-actuating means.

6. In a device of the kind described and in combination, a movable chart, a marker for recording thereon, a fuel tank having a fuel chamber, a float in said chamber, a frame carrying said float, guide means for preventing lateral movement of said float, a toothed wheel carried by said tank, a chain operating said toothed wheel, said chain being secured to said float and movable therewith to actuate said toothed wheel, and electrical means engaged by successive teeth on said wheel to move said marker to indicate on said chart successive increments of total fuel consumed.

7. In a device of the kind described and in combination, a movable chart, a marker for recording fuel consumption in increments of the total fuel thereon, a fuel tank having a fuel chamber, a float in said chamber, a frame carrying said float, guide means for preventing lateral movement of said float, a toothed wheel carried by said tank, a chain operatively connected with said toothed wheel, said chain being secured to said float and movable therewith to actuate said toothed wheel, electromagnetic means controlling said marker, and electrical relay means engaged by successive teeth on said wheel to operate said electromagnet to move said marker to indicate on said chart successive increments of total fuel consumed.

8. In a device of the kind described and in combination, a chart, marking means for recording information thereon, a pair of alternately acting solenoids having a common plunger controlled thereby, said plunger operatively controlling the movement of said marking means, said plunger being of such a length that it gives the maximum pull as one solenoid circuit is made and the other broken.

9. In a device of the kind described and in combination, a chart, marking means for recording information thereon, a driving screw, a pair of racks on opposite sides of said screw and alternately operatively engageable therewith and controlling the movement of said marking means, a pair of alternately acting solenoids having a common plunger controlled thereby, said plunger operatively controlling the engagement and disengagement of said racks, said plunger being of such a length that it gives the maximum pull on one of said racks as one solenoid circuit is made and the other broken, after which the magnetic force decreases until the rack engages the screw, whereby there is a minimum amount of frictional loss between said rack and screw.

10. In a device of the kind described and in combination, a chart, a plotting arm movable periodically relative to said chart, means for positively moving said plotting arm, and electrically controlled mechanism for periodically controlling the movement of said arm, including a circuit breaker operative at intervals, mechanism controlled thereby, circuit breakers controlled by said mechanism, and mechanism operatively connected with the plotting arm and automatically controlled by said circuit breakers.

11. In a device of the kind described and in combination, a chart, a plotting arm movable periodically relative to said chart, means for positively moving said plotting arm, and electrically controlled mechanism for periodically controlling the movement of said arm, including an electric circuit having a circuit breaker therein operative at intervals, mechanism operatively controlled thereby, circuit breakers mechanically actuated by said mechanism, and electrically controlled and actuated mechanism operatively connected with the plotting arm and automatically controlled by said circuits through circuit breakers.

12. In a device of the kind described and in combination, a chart, a movable plotting arm provided with means for indicating its movement on said chart, mechanically actuated means for moving said arm, and electrically controlled and actuated mechanisms for automatically periodically controlling the movement of said arm, including a chronometer, a relay including circuit breakers, a plurality of solenoids provided with mechanism cooperating with the actuating mechanism for said plotting arm, said relay and solenoids being electrically connected, whereby the same cooperate to control the driving connection between the plotting arm and its actuating mechanism in a predetermined manner.

13. In a vehicle testing apparatus of the kind described and in combination, a movable chart, movable plotting arms mounted in operative relation thereto and provided with means for recording relative movements on the chart, means dependent upon and actuated by movement of the vehicle for moving said arms and chart in a definite relation to the movement of the vehicle, means for controlling one arm at intervals of time, and means for controlling the movement of the other arm at intervals dependent upon fuel consumption required to drive the vehicle.

14. In a vehicle testing apparatus of the kind described and in combination, a movable chart, movable plotting arms mounted in operative relation thereto and provided with means for recording relative movements on the chart, means dependent upon and actuated by movement of the vehicle for moving said arms and chart in a definite relation to the movement of the vehicle, means for controlling one arm in a predetermined manner at definite intervals of time, and means for controlling the movement of the other arm at definite intervals dependent upon fuel consumption required to drive the vehicle.

15. In a vehicle testing instrument of the kind described and in combination, a chart, means for recording on said chart at definite intervals the speed of the vehicle, means for recording on the chart the fuel consumption, means for recording on the chart desired information relative to the conditions of the test and common means for adjusting said speed recording means and said fuel consumption recording means.

16. In apparatus of the kind described and in combination, a continuously movable chart having scale lines thereon, means operating in conjunction with said scale lines for indicating and recording desired information at different intervals on said chart, said last-mentioned means comprising a frame movable relatively to said chart, marking means associated with said frame, and electro-magnetic means for periodically moving said frame in alternate directions.

17. In a device of the kind described and in combination, a movable chart, a marker for recording thereon, a fuel tank having a fuel chamber, a float in said chamber, a toothed wheel carried by said tank, a chain secured to said float and movable therewith to actuate said toothed wheel, and electrical means engaged by successive teeth on said wheel to move said marker to indicate on said chart successive increments of total fuel consumed.

In testimony whereof, I have hereunto signed my name.

CLAUDE E. COX.